United States Patent [19]
Nigo et al.

[11] Patent Number: 5,678,417
[45] Date of Patent: Oct. 21, 1997

[54] AIR CONDITIONING APPARATUS HAVING DEHUMIDIFYING OPERATION FUNCTION

[75] Inventors: Toshiro Nigo, Fuji; Atsushi Nagasawa, Mishima; Kenichi Tomiyoshi, Fuji; Teturo Ozawa, Numazu; Kouji Wada, Fuji; Ichiro Hongo, Yokohama; Hiroyuki Tokita, Fuji; Hiroyuki Tanaka, Fuji; Makoto Watanabe, Fuji, all of Japan

[73] Assignee: Kabushiki Kaisha Toshiba, Japan

[21] Appl. No.: 608,467

[22] Filed: Feb. 28, 1996

[30] Foreign Application Priority Data

Jun. 28, 1995 [JP] Japan .................. 7-161874
Sep. 29, 1995 [JP] Japan .................. 7-254181

[51] Int. Cl.$^6$ .................................. F24F 11/00
[52] U.S. Cl. ................ 62/186; 236/49.3; 236/44 R
[58] Field of Search .................. 62/179, 180, 186, 62/173, 176.1, 176.5, 176.6, 222, 224, 225; 236/1 B, 49.1, 49.3, 44 R, 44 A, 44 C; 165/222, 227, 228

[56] References Cited

U.S. PATENT DOCUMENTS 4,807,444  2/1989  Aoki et al. .................. 62/179
5,072,878  12/1991 Aoki et al. .................. 236/49.3 X
5,341,650  8/1994  Nagasawa et al. .......... 62/186 X
5,547,018  8/1996  Takahashi et al. .......... 236/49.3 X

FOREIGN PATENT DOCUMENTS 5-22757  6/1993  Japan .

*Primary Examiner*—Harry B. Tanner
*Attorney, Agent, or Firm*—Cushman Darby & Cushman Intellectual Property Group of Pillsbury Madison & Sutro, LLP

[57] ABSTRACT

At the time of dehumidifying operation, a motor-operated expansion valve is controlled so that evaporation of a refrigerant will be completed in an auxiliary indoor heat exchanger which constitutes an indoor heat exchanger together with a main indoor heat exchanger. A louver is operated to form an air passage through which air discharged from the outlet port of an indoor unit flows to the inlet port. Owing to the formation of such an air passage from the outlet to the inlet port of the indoor unit, dehumidification is performed with outlet air kept from reaching the living space in the room.

11 Claims, 15 Drawing Sheets

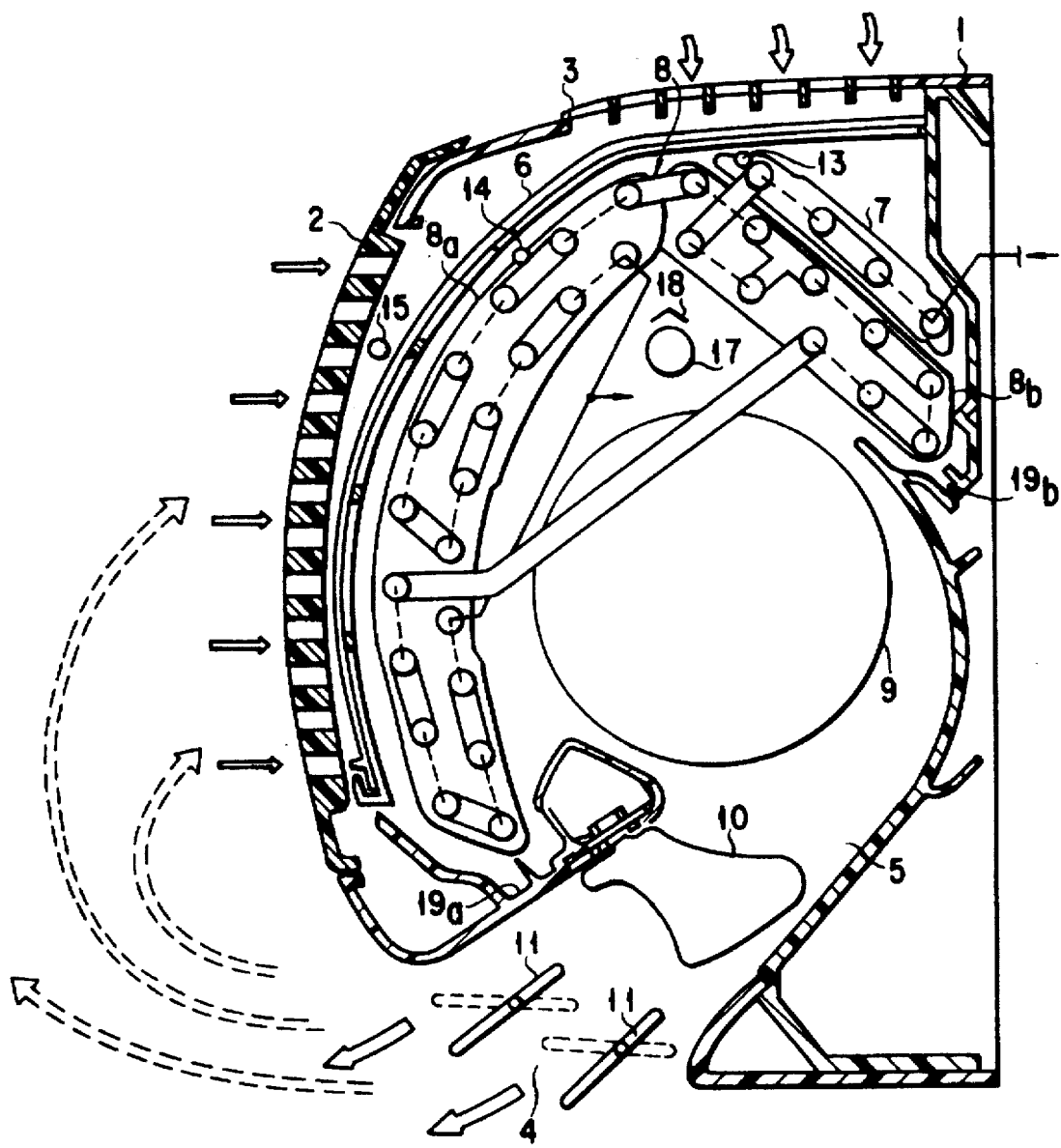
F I G. 1

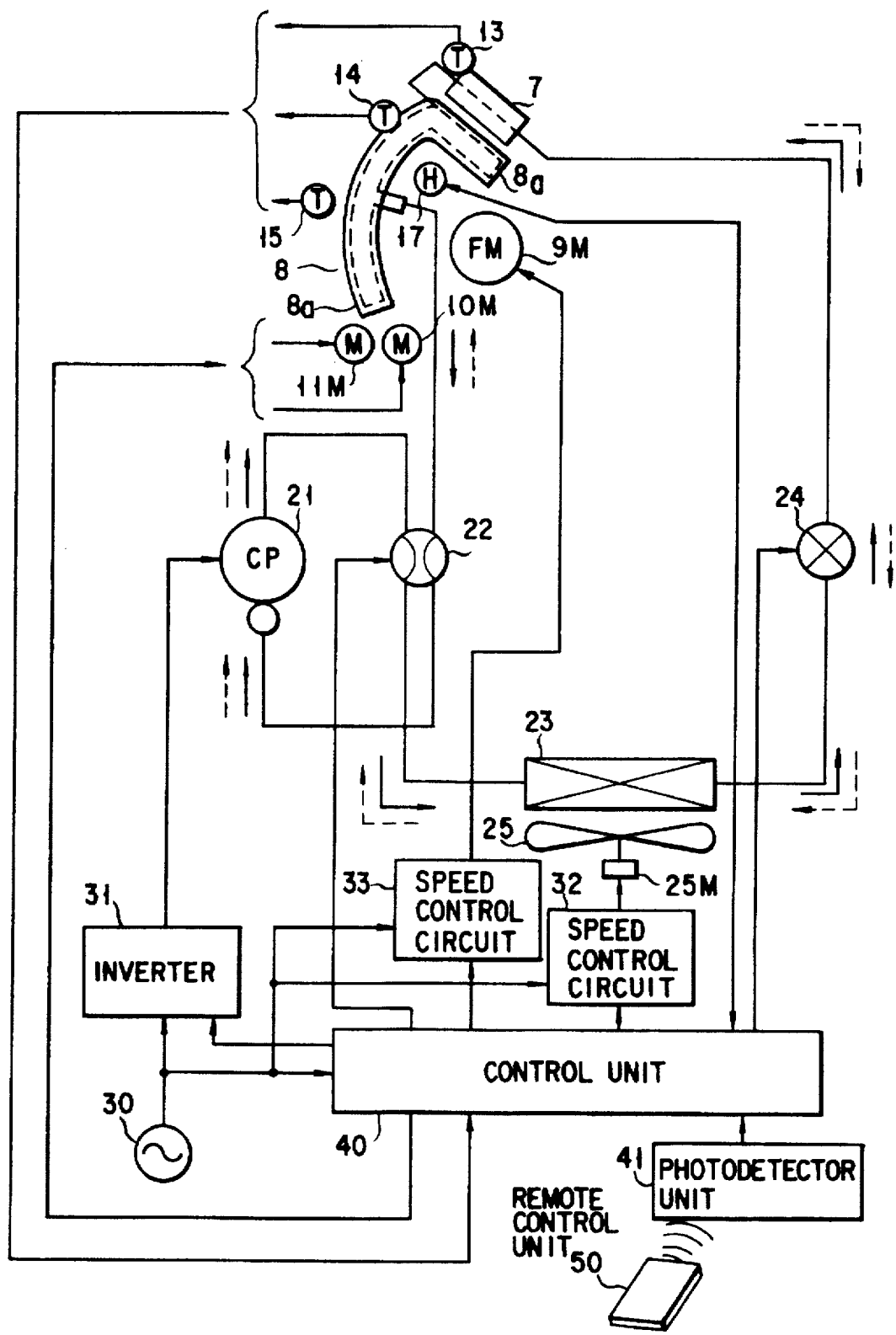
F I G. 2

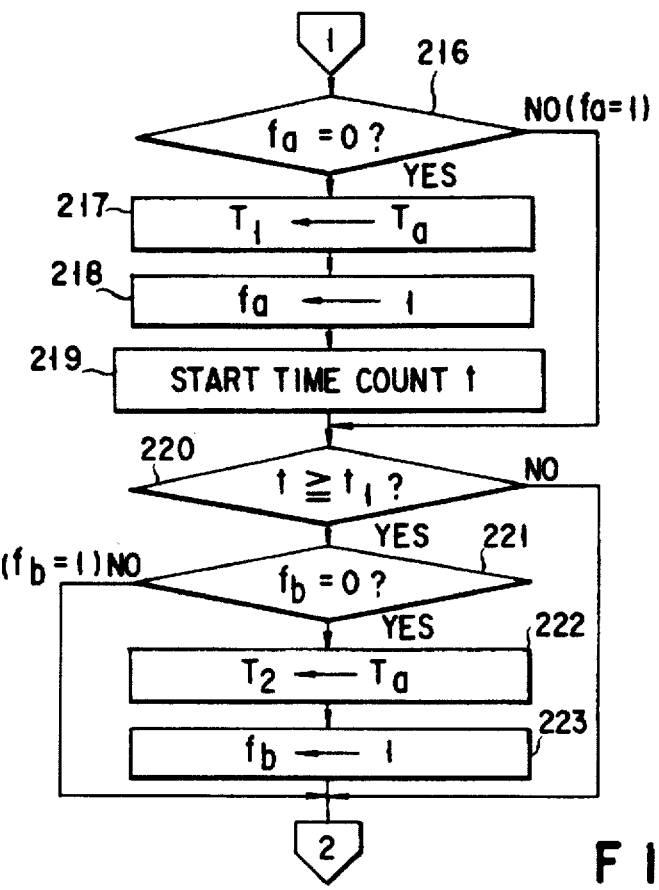
F I G. 11
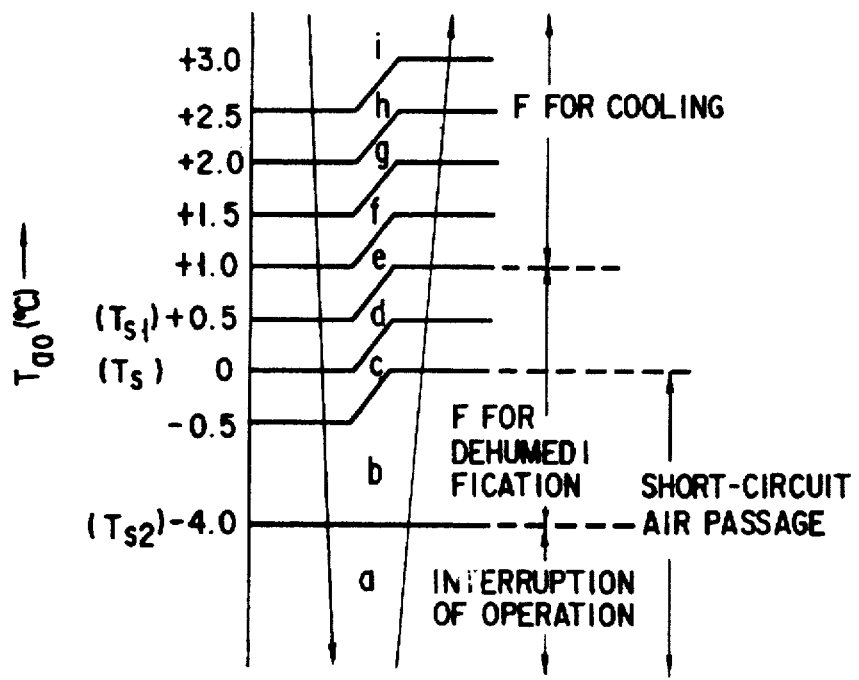
F I G. 12

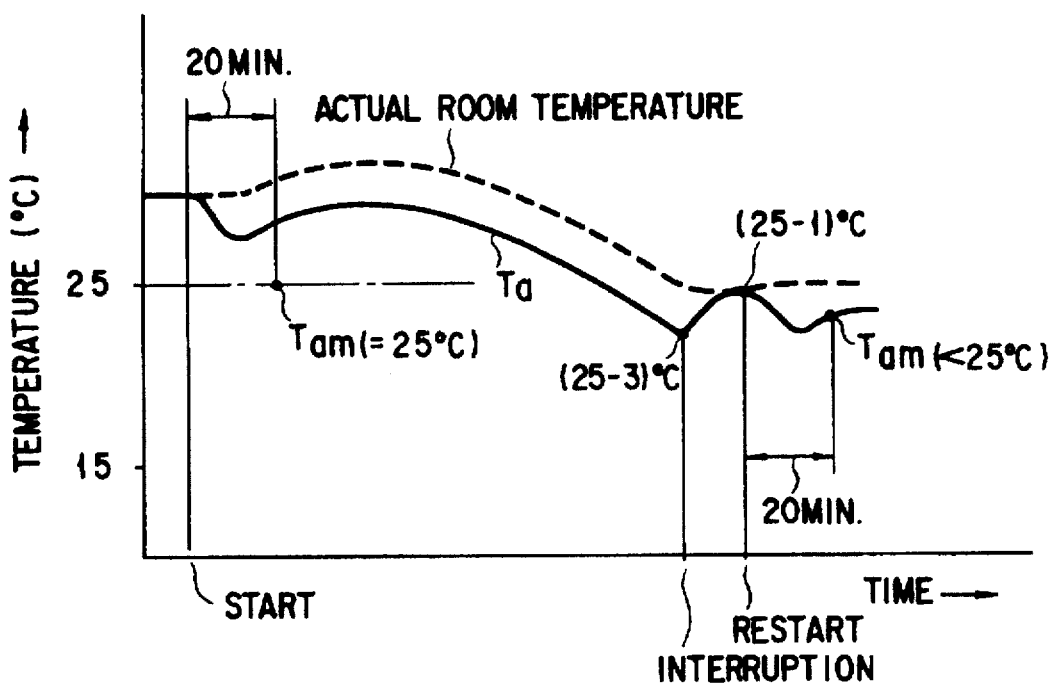
F I G. 17
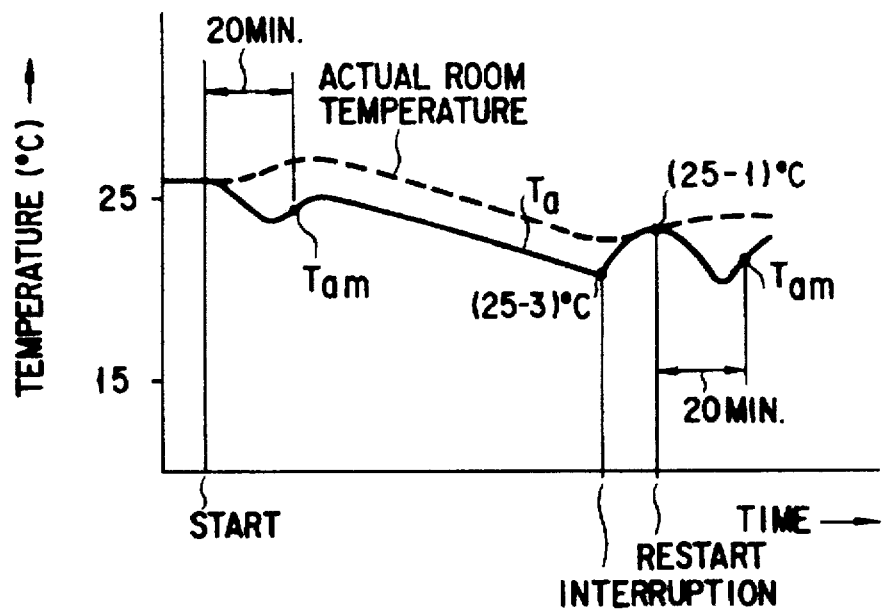
F I G. 18

AIR CONDITIONING APPARATUS HAVING DEHUMIDIFYING OPERATION FUNCTION

BACKGROUND OF THE INVENTION

1. Field of the Invention

The invention relates to an air-conditioning apparatus for dehumidifying the interior of a room by condensing the moisture in the air by means of an indoor heat exchanger.

2. Description of the Related Art

An air-conditioning apparatus is equipped with a refrigerating cycle in which a compressor, an outdoor heat exchanger, an expansion device and an indoor heat exchanger are coupled by pipes in series.

Cooling is carried out by returning a refrigerant discharged from the compressor through the outdoor heat exchanger, expansion device and indoor heat exchanger to the compressor. At the time of this cooling process, the moisture in the air is condensed by the indoor heat exchanger, thus dehumidifying the indoor air.

In a season when the indoor air temperature is not too high but the humidity is too high, the humidification is preferable to the cooling.

With a conventional dehumidification operation, however, the indoor air is not only dehumidified but cooled as well. Thus, a problem arises in that the indoor temperature is lowered. When cold air is discharged from the indoor heat exchanger, persons in the living space in the room may feel chilly.

SUMMARY OF THE INVENTION

The object of the invention is to provide an air conditioning apparatus which prevents cold air from reaching the living space in the room and so permits the indoor air to be dehumidified to a comfortable level.

According to the present invention there is provided an air-conditioning apparatus having a dehumidifying operation function comprising: a refrigerating cycle constructed from a compressor, an outdoor heat exchanger, an expansion device, and an indoor heat exchanger which are coupled in series; an indoor fan for circulating indoor air through said indoor heat exchanger; an indoor unit accommodating said indoor fan and said indoor heat exchanger and having an inlet port for drawing in indoor air and an outlet port for discharging air passed through said indoor heat exchanger; air-flow direction control means installed at said outlet port; dehumidifying operation means for performing a dehumidifying operation by carrying a refrigerant discharged from said compressor through said outdoor heat exchanger, said expansion device, and said indoor heat exchanger to said compressor; and operation means for, at the time of said dehumidifying operation, operating said air-flow control means to form an air passage through which air discharged from said outlet port flows to said inlet port.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings which are incorporated in and constitute a part of the specification, illustrate presently preferred embodiments of the invention and, together with the general description given above and the detailed description of the preferred embodiments given below, serve to explain the principles of the invention.

FIG. 1 is a cross-sectional view of an indoor unit of an air conditioning apparatus according to a first embodiment of the invention;

FIG. 2 shows a pipe arrangement in a refrigerating cycle and an arrangement of a control unit in the first embodiment;

FIGS. 10 and 11 are a flowchart of the operation in room temperature priority mode in the second and third embodiments;

FIG. 12 shows operating-frequency control conditions in the room temperature priority mode in the second and third embodiments;

FIG. 17 shows changes in sensed temperature when the room temperature is high in the third embodiment; FIG. 18 shows changes in sensed temperature when the room temperature is low in the third embodiment;

DETAILED DESCRIPTION OF THE PREFERRED EMBODIMENTS

Figure 3:
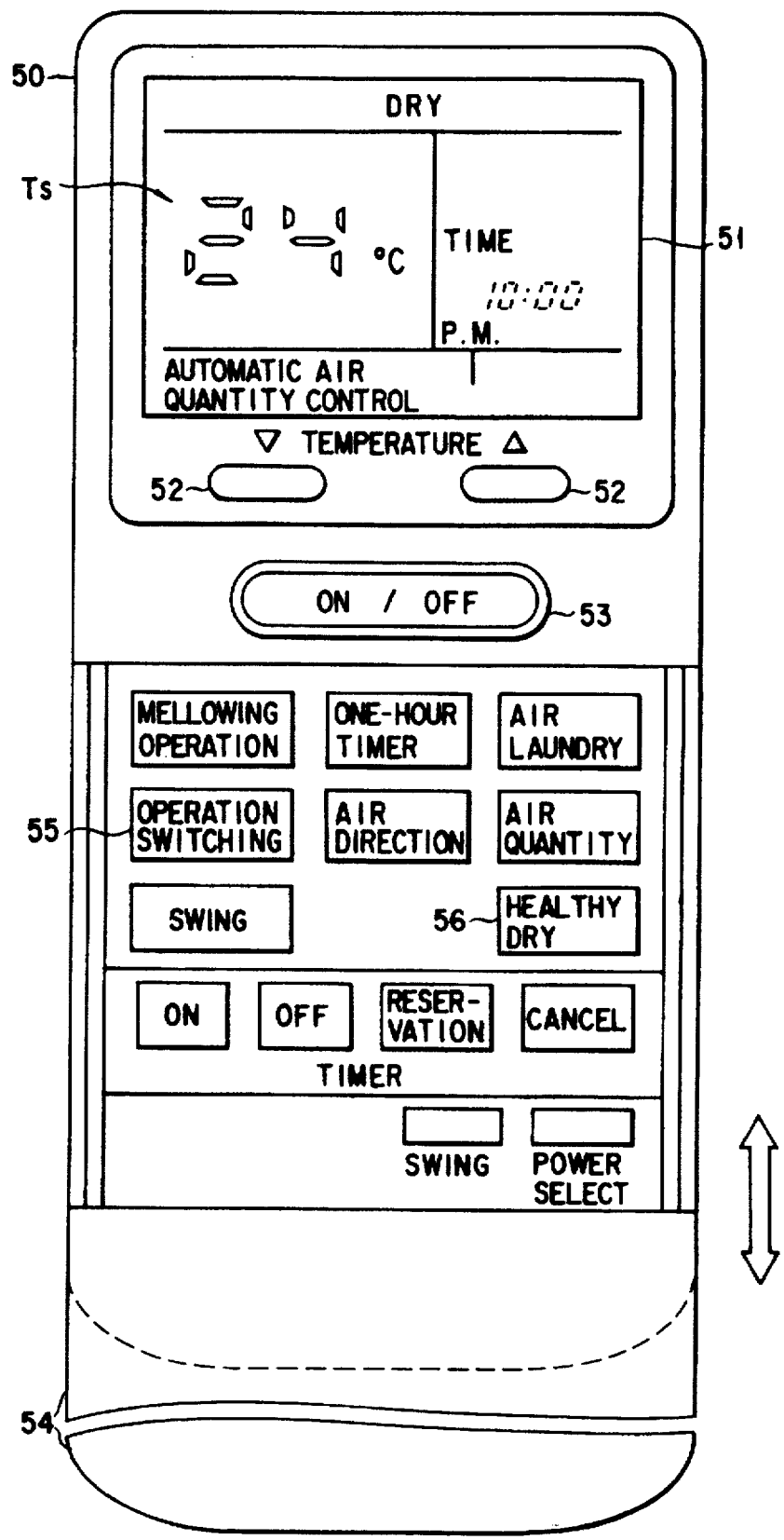
FIG. 3 is an exterior view of a remote control type of operation unit for use with air conditioning apparatuses of the respective embodiments of the invention.

Referring now to FIG. 1, an indoor unit 1 has an indoor air inlet port 2 in the front, an indoor air inlet port 3 on the top, and an air-conditioned air (cooled air, dehumidified air, heated air, or the like) outlet port 4 at the bottom on the front side.

The indoor unit 1 is formed inside with a ventilation path 5 extending from the inlet ports 2 and 3 to the outlet port 4. In the ventilation path 5, a dust (and deodorizing) filter 6 is provided inside the inlet ports 2 and 3. A main indoor heat exchanger 8 and an auxiliary indoor heat exchanger 7 are installed inside the filter 6. An indoor fan 9 is installed inside the heat exchangers 7 and 8, which functions to circulate indoor air through the heat exchangers 7 and 8.

The main indoor heat exchanger 8 is divided into a first indoor heat exchanger 8a and a second indoor heat exchanger 8b, which are placed in the shape of the reverse of the letter V to surround the indoor fan 9. The first indoor heat exchanger 8a is provided to face the inlet port 2 in the front, while the second one 8b, is provided to face the inlet port 3 on the top.

The auxiliary indoor heat exchanger 7 is placed between the second indoor heat exchanger 8b, and the inlet port 3, i.e., on the windward side of the second heat exchanger 8b, in the indoor air intake passage.

Between the heat exchangers 8a and 8b, and the indoor fan 9 are placed an electric heater 17 and a water avoiding member 18. The electric heater 17 is intended to heat the air passed through the heat exchangers 8a and 8b, as required. The water avoiding member 18 is provided to prevent a drain from falling from the heat exchangers 8a and 8b, on to the heater 17.

A drain collector 19a is formed below the first heat exchanger 8a, and a drain collector 19b is formed below the second heat exchanger 8b, and the auxiliary heat exchanger 7.

Although the first and second indoor heat exchangers 8a and 8b, are brought into contact with each other by their radiation fins, there is provided a space between the second heat exchanger 8b, and the auxiliary heat exchanger 7. That is, their radiation fins are not in contact with each other, or are isolated thermally.

When the indoor fan 9 rotates, indoor air is sucked through the inlet ports 2 and 3 into the indoor unit 1. The air from the inlet port 2 passes through the filter 6 and then flows toward the indoor fan 9 through the first indoor heat exchanger 8a. The intake air from the inlet port 3 passes through the filter 6 and then flows toward the fan 9 through the auxiliary heat exchanger 7 and the second heat exchanger 8b.

A plurality of left-and-right air-flow direction control louvers 10 is installed in a place facing the outlet port 4 downstream of the indoor fan 9. This louvers 10, which is motor driven, sets the direction of the outlet air in the left-and-right direction with respect to the indoor unit 1.

Downstream of the left-and-right louvers 10 there are provided a plurality of, for example, a pair of up-and-down louvers 11 which are arranged in an up-and-down direction and are driven conjointly by a single motor. At the time of operation, the control louvers 11 turn clockwise to open the outlet port 4 and set the direction of discharged wind in the up-and-down direction with respect to the indoor unit 1. At the time of stopping the operation, on the other hand, the louvers 11 rotate counterclockwise to close the outlet port 4, thus preventing dust from entering into the indoor unit 1.

As shown in FIG. 2, an outdoor heat exchanger 23 is pipe-connected to the outlet of a compressor 21 through a four-way valve 22. To the heat exchanger 23 is pipe-connected an expansion device, for example, an electrically operated expansion valve 24, which is controlled so that its opening varies continuously according to the number of input drive pulses.

The auxiliary indoor heat exchanger 7 has its one end pipe-connected to the motor-operated valve 24 and its other end pipe-connected to the main indoor heat exchanger 8 (the first and second indoor heat exchangers 8a and 8b). The inlet of the compressor 21 is pipe-connected to the main indoor heat exchanger 8 through the four-way valve 22.

In this manner, a heat pump type of refrigerating cycle is constructed which permits cooling, dehumidifying, and heating operations.

At the time of cooling, as shown by solid arrows in FIG. 2, a cooling cycle is formed in which a refrigerant discharged from the compressor 21 flows from the four-way valve 22 through the outdoor heat exchanger 23, the motor-operated expansion valve 24, and the auxiliary indoor heat exchanger 7 to the main indoor heat exchanger 8 and the refrigerant from the main heat exchanger 8 returns to the compressor 21 through the four-way valve 22. In this case, the outdoor heat exchanger 23 functions as a condenser and the auxiliary heat exchanger 7 and the main indoor heat exchanger 8 function as an evaporator.

At the time of dehumidification, a dehumidifying cycle is formed in which a refrigerant flows in the same direction as with the cooling cycle.

At the time of heating, the four-way valve 22 is changed over and a heating cycle is thus formed in which, as shown by broken lines in FIG. 2, a refrigerant discharged from the compressor 21 flows from the four-way valve 22 through the main indoor heat exchanger 8, the auxiliary indoor heat exchanger 7, and the motor-operated expansion valve 24 to the outdoor heat exchanger 23 and the refrigerant passed through the outdoor heat exchanger 23 returns to the compressor 21 through the four-way valve 22. In this case, the auxiliary and main indoor heat exchangers 7 and 8 serve as a condenser and the outdoor heat exchanger 23 serves as an evaporator.

As shown in FIGS. 1 and 2, a temperature sensor 13 is mounted on the heat exchanging pipe on the outlet side of the auxiliary heat exchanger 7 and a temperature sensor 14 is mounted on the heat exchanging pipe in the intermediate portion of the first indoor heat exchanger 8a.

A room temperature sensor 15 is provided in the indoor air intake passage between the inlet port 2 and the main indoor heat exchanger 8. In the vicinity of the outdoor heat exchanger 23 is provided an outdoor fan 25 which supplies outdoor air to the outdoor heat exchanger 23.

To a commercial AC power source 30 are connected an inverter 31, a speed control circuits 32 and 33 and a control unit 40. To the control unit are connected the inverter 31, the speed control circuits 32 and 33, motors 10M and 11M for driving the air-flow direction control louvers 10 and 11, the room temperature sensor 15, the electric heater 17, the four-way valve 22, the motor-operated expansion valve 24, and a photodetector unit 41.

The inverter 31 rectifies the supply voltage and converts it into a voltage of a frequency F (and a level) specified by a command from the control unit 40. The output of the inverter 31 is supplied to the driving motor of the compressor 21 as its driving power.

The speed control circuit 32 controls the supply voltage to an outdoor fan motor 25M by means of phase control by way of example, thereby setting the speed of the outdoor fan motor 25M—and thus the quantity of air delivered by the outdoor fan 25—to a value specified by the control unit 40. Likewise, the speed control circuit 33 controls the indoor fan motor 9M to thereby set its speed (the quantity of air delivered by the indoor fan 9) to a value specified by the control unit. The photodetector unit 42 receives infrared rays emitted from a remote control type of operating unit 50, which is hereinafter referred to as a remote control unit.

As shown in FIG. 3, the remote control unit 50 is equipped on its top with a display 51, temperature regulating buttons 52, an operation/stop button 53, and a slide cover 54. The slide cover 54 can be moved along bold arrows shown and permits inside operating buttons to be exposed when moved toward the bottom of the drawing sheet. The operating buttons that are exposed include an operation switching button 55 for making a selection among cooling operation, heating operation, and dehumidifying operation and a dehumidification-dedicated button 56 for selecting the dehumidifying operation independently.

The control unit 40 controls the whole air conditioning apparatus and has the following functional means:

[1] Cooling operation means for performing an cooling operation by forming a cooling cycle in which refrigerant discharged from the compressor 21 flows from the four-way value 22 through the outdoor heat exchanger 23, the motor-operated expansion valve 24, the auxiliary indoor heat exchanger 7, and the main indoor heat exchanger 8 and then returns to the compressor 21 through the four-way valve 22.

[2] Dehumidifying operation means for performing a dehumidifying operation by forming a dehumidifying cycle in which refrigerant discharged from the compressor 21 flows from the four-way valve 22 through the outdoor heat exchanger 23, the expansion valve 24, the auxiliary indoor heat exchanger 7, and the main indoor heat exchanger 8 and then returns to the compressor 21 through the four-way valve 22.

[3] Operating means for, at the time of dehumidifying operation, forming an air passage (so-called short-circuit air passage) through which air discharged from the outlet port 4 flows to the inlet port 2 by rotating the up-and-down louvers 11 upward from the horizontal blowoff position.

[4] Speed control means for, at the time of dehumidifying operation, driving the indoor fan 9 at low speed.

Figure 4:
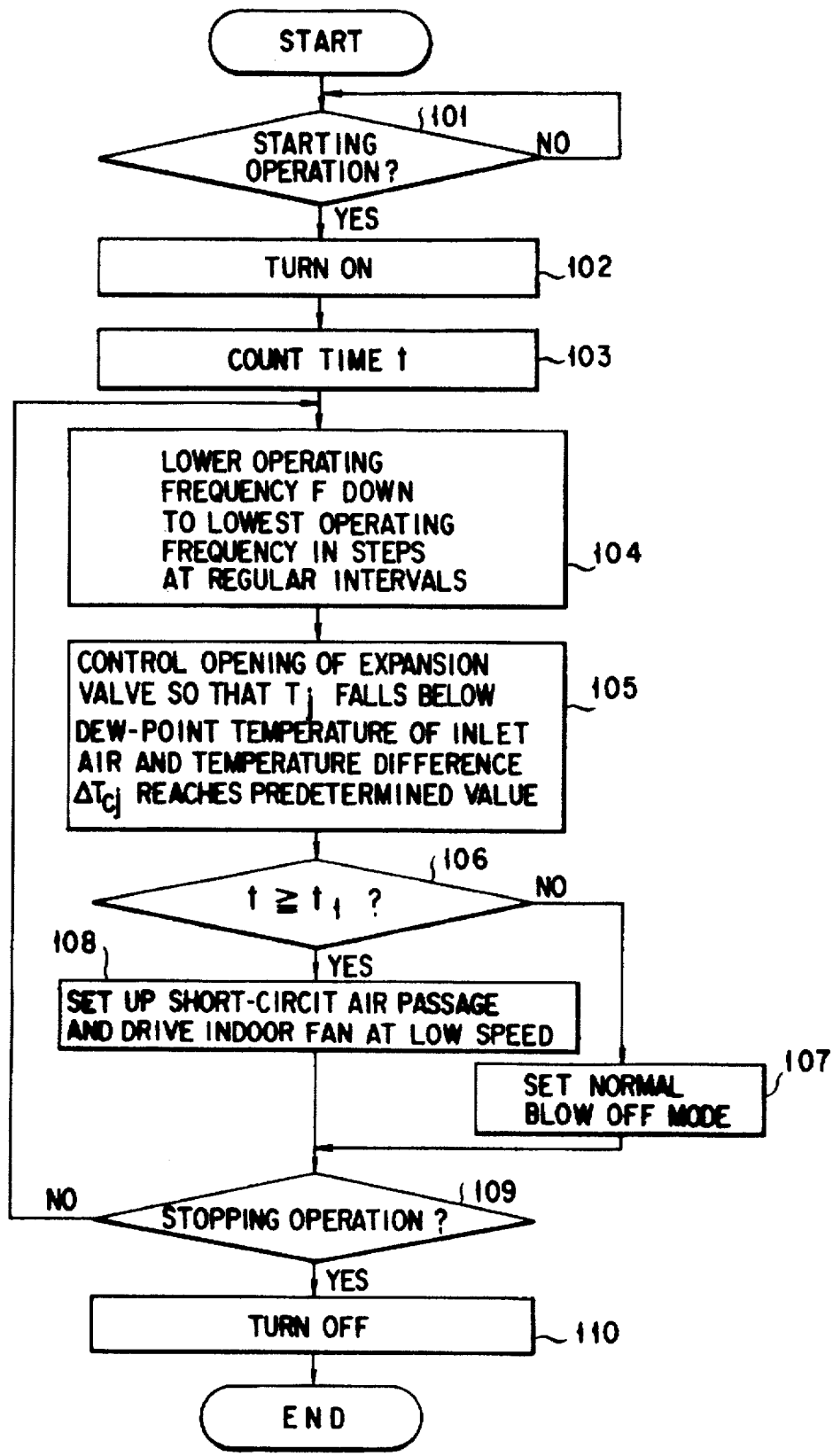
FIG. 4 is a flowchart of the operation of the first embodiment.

Hereinafter, the operation of the above-described arrangement will be described with reference to a flowchart of FIG. 4.

When the dehumidificataion mode is set and a starting operation is performed on the remote control unit 50 (YES in step 101), the compressor 21 is activated to form the dehumidifying cycle and the operation of the indoor fan 9 and the outdoor fan 25 is started, whereby the dehumidifying operation is started (step 102). At the same time, an operation of time count t is started (step 103).

At startup, the operating frequency F of the compressor 21 is first set to a given value (for example, 16 Hz) which is decided taking dehumidification startup into consideration and then lowered down to the lowest operating frequency Fmin (for example, 9 Hz) in steps at regular intervals (step 104).

At the same time the operating frequency is controlled, the opening of the motor-operated expansion valve 24 is controlled so that the refrigerant will be evaporated completely in the auxiliary indoor heat exchanger 7 and the refrigerant will be superheated in the main indoor heat exchanger 8.

To be specific, the opening of the expansion valve 24 is controlled so that the difference $\Delta Tcj$ between the temperature Tc of the main indoor heat exchanger 8 sensed by the temperature sensor 14 and the temperature Tj of the auxiliary indoor heat exchanger 7 sensed by the temperature sensor 13 will reach a predetermined value $\Delta Tcj_1$ and the temperature Tj will reach the dew-point temperature of inlet air or below (step 105). The value $\Delta Tcj_1$ is set proportional to the operating frequency F of the compressor 21.

If, for example, $\Delta Tcj$ is larger than $\Delta Tcj_1$, then the opening of the expansion valve 24 is reduced by a predetermined value with each control loop. If, on the other hand, $\Delta Tcj$ is smaller than $\Delta Tcj_1$, then the opening of the expansion valve is increased by a predetermined value with each control loop. When $\Delta Tcj$ becomes equal to $\Delta Tcj_1$, the opening of the expansion valve at that time is held as it is.

By the control of the valve opening, the intake air is cooled and dehumidified almost only by the auxiliary indoor heat exchanger 7 and then discharged into the room without heat exchange in the main indoor heat exchanger 8. The water on the auxiliary indoor heat exchanger 7 drains along its heat exchanging pipe and radiation fins into the drain collector 19b.

Here, the dehumidification function of the auxiliary indoor heat exchanger 7 will be described.

When the operating frequency F goes high, the quantity of circulating refrigerant increases. If $\Delta Tcj_1$, which is the target value of $\Delta Tcj$, were constant for any operating frequency F, then an increase in the quantity of the circulating refrigerant would result in the auxiliary indoor heat exchanger 7 alone failing to finish evaporating the refrigerant. Namely, the evaporation of the refrigerant would occur in the main indoor heat exchanger 8 as well. In such a case, not only the dehumidification function but the cooling function as well would be achieved.

If the temperature difference, $\Delta Tcj$, can be changed according to a change of the operating frequency F, then the auxiliary indoor heat exchanger 7 alone will finish evaporating the refrigerant irrespective of any increase in the quantity of the circulating refrigerant. For this reason, $\Delta Tcj_1$ is set proportional to the operating frequency F. This allows the auxiliary indoor heat exchanger 7 alone to have the dehumidification function irrespective of a change in the capacity of the compressor 21, thus successfully checking a decrease in the room temperature.

Figure 5:
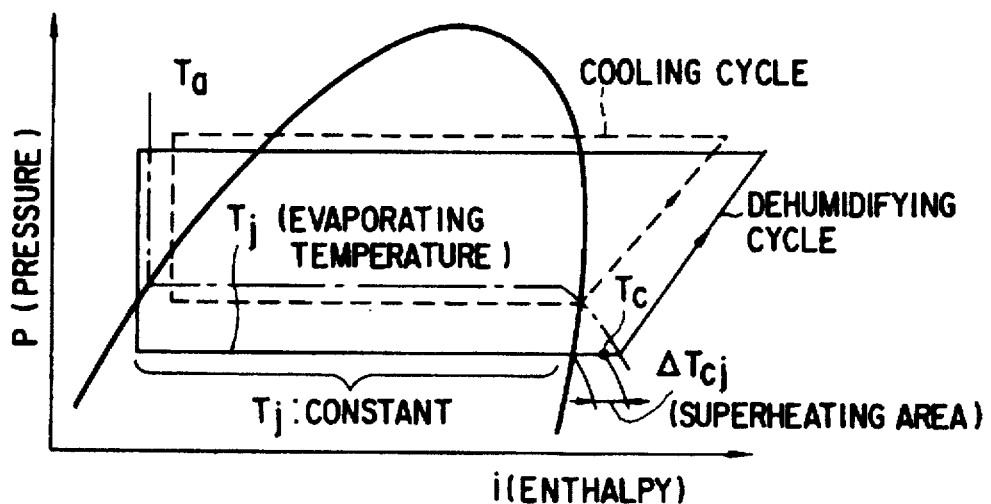
FIG. 5 is a Mollier diagram of the refrigerating cycle in the first embodiment.

FIG. 5 is a Mollier chart illustrating a relation among the temperature Tj of the auxiliary indoor heat exchanger 7, the temperature Tc of the main indoor heat exchanger 8, and the temperature difference $\Delta Tcj$.

When $\Delta Tcj$ is smaller than $\Delta Tcj_1$, it is determined that the temperature Tj of the auxiliary indoor heat exchanger 7 (i.e., the evaporating temperature) is a little high. Thus, the motor-operated expansion valve 24 is controlled in a direction to reduce its opening.

By reducing the opening of the expansion valve 24, the evaporating pressure is lowered to decrease the evaporating temperature Tj, whereby the difference between the evaporating temperature Tj and the intake air temperature Ta is made larger. This promotes the heat exchange between the refrigerant and the air in the auxiliary indoor heat exchanger 7, allowing the evaporation of the refrigerant to be finished by the auxiliary indoor heat exchanger 7 only. At this point, the superheated area for the refrigerant becomes large and all the main indoor heat exchanger 8 comes to serve as a superheated area, so that the temperature Tc of the main heat exchanger approaches the intake air temperature Ta. That is, the main heat exchanger 8 will not serve the cooling function.

According to this control procedure, the evaporating temperature Tj can be lowered greatly in comparison with the case where, as with the cooling operation, the refrigerant is evaporated in the whole indoor heat exchanger (including the auxiliary indoor heat exchanger 7 and the main indoor heat exchanger 8).

Suppose here that the refrigerant evaporates in the whole indoor heat exchanger. If the evaporating temperature were greatly lowered below the dew-point temperature of intake air in order to obtain the dehumidification capability, then even the temperature of air discharged into the room would be greatly lowered. In the air-line chart of FIG. 6, the intake air temperature is indicated by the point A. In order to prevent the temperature of air discharged into the room from falling, the lower limit on the evaporating temperature will be the C point (15 degrees).

In contrast, even if, when dehumidification is performed by the auxiliary indoor heat exchanger 7 alone, the evaporating temperature is lowered down to the C' point with the intake air temperature at A, the room temperature is difficult to fall because the temperature Tc of the main indoor heat exchanger 8 is equal to the air temperature. That is, the dehumidification capability can be enhanced without causing the room temperature to fall.

It may be thought that, when the area of an heat exchanger is small like the auxiliary heat exchanger 7, the dehumidification capability cannot be obtained sufficiently even if the evaporating temperature is greatly lowered. Suppose that the ratio of the heat exchanging area of the auxiliary heat exchanger 7 to that of the main heat exchanger 8 is 1:5 by way of example. Then, the area of the auxiliary heat exchanger 7 will take up ⅙ of the area of the whole heat exchanger. If the difference between the dew-point temperature and the evaporating temperature is set to a value that substantially corresponds to the reciprocal of ⅙, then an amount of water that is nearly equal to that in the dehumidification by the whole indoor heat exchanger will be condensed to dew. That is, the dehumidification power of substantially the same level as the dehumidification by the whole indoor heat exchanger can be attained.

Figure 6:
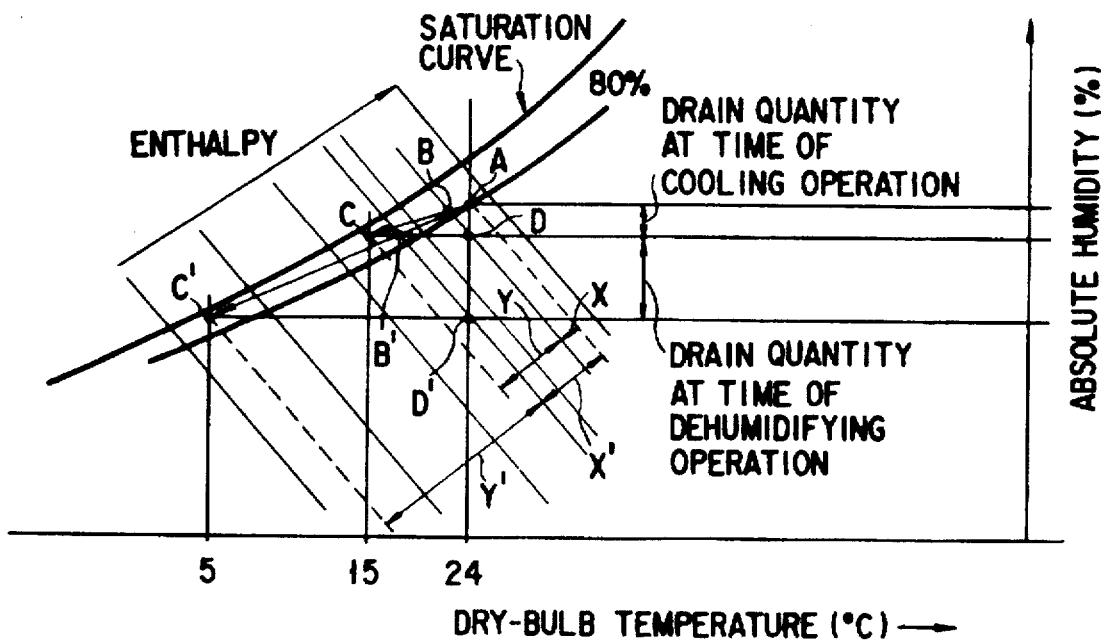
FIG. 6 is an air-line diagram based on the refrigerating cycle in the first embodiment.

In the air-line chart of FIG. 6, the components X and X' of the lines A–B and A–B', which are perpendicular to isoentropic curves, indicate the latent heat cooling power (the quantity of heat required for water in the air to change from water vapor to water droplets), while the components Y and Y' of the lines B–C and B–C', which are perpendicular to isoentropic curves, indicate the sensible heat cooling power (the quantity of heat required for air temperature to fall).

As can be seen from this chart, the ratio of latent heat to sensible heat in the present embodiment is large as compared with that in the case where heat exchange is made by the whole indoor heat exchanger. That is, $(X/Y)<(X'/Y')$ Consequently, unlike the cooling operation, the sufficient dehumidifying power can be obtained without a fall in the temperature of air discharged into the room.

The time count operation has been started simultaneously with the dehumidifying operation (step 103). The normal blowoff mode is set (step 107) until a given time t is reached (NO in step 106). In this mode, the up-and-down louvers 11 take up any position as instructed by the remote control unit 50.

When the time $t_1$ is reached, the up-and-down louvers 11 are rotated upward from the horizontal blowoff position as indicated by broken lines in FIG. 1. Thereby, the air passage in which air discharged from the outlet port 4 flows to the inlet port 2, the so-called short-circuit air passage, is formed, preventing the outlet air from reaching the living space in the room (step 107).

Thus, the dehumidification operation can be continued while preventing the outlet air from reaching the living space, permitting comfortable dehumidification with no feeling of the air cold. By the short-circuit air passage being formed, part of air will be sucked continuously into the inlet port 2. However, it should be noted that the diffusion speed of moisture in the air is great enough to dehumidify air in the living space.

The indoor fan 9 is driven at a low speed simultaneously with the formation of the short-circuit air passage. Owing to the slow-speed operation of the fan, the air discharged from the outlet port 4 flows to the inlet port 2 without flowing far away, ensuring that a short-circuit air passage is formed.

The moisture in the air moves by diffusion, not by air flow. As can be seen from this fact, stopping of the indoor fan 9 during dehumidifying operation will not impair the dehumidifying power. If the indoor fan 9 were stopped, cold air would flow from the space between the outlet port 4 and the louvers 11. The reason why the fan 9 is driven at low speed includes preventing cold air from flowing out.

The given interval $t_1$ which elapses from the start of dehumidifying operation to the time when the short-circuit air passage is formed is selected to approximate the time it takes for a person in the living space to begin to feel the air cold. Taking into consideration the fact that some people utilize the dehumidification as weak cooling, the short-circuit air passage is not formed and the normal blowoff is performed until a feeling of cold is generated.

When the short-circuit air passage is formed, the right-and-left louvers 10 is set to take up the center position at the same time the up-and-down louvers 11 are moved. The air discharged from the outlet port 4 will widen in the right-and-left direction. Thus, there is a possibility that the' short-circuit passage may not be formed well. The right-and-left louvers 10 is thus operated in such a way as to concentrate the outlet air centrally and avoid air leakage in the right-and-left direction. This ensures that the short-circuit air passage is formed.

The actual operating frequency F of the compressor 21 is selected to be much lower than that at the time of cooling operation taking into consideration that control is such that the refrigerant is evaporated only in the auxiliary indoor heat exchanger 7 and that the dehumidifying operation itself is frequently selected in seasons when the room temperature is not too high. Thus, power consumption is reduced and the energy-saving effect is achieved.

The spacing is secured between the radiation fins of the auxiliary and main heat exchangers 7 and 8 so that they are isolated thermally. Thus, a sufficient temperature difference can be maintained between the auxiliary heat exchanger 7 that serves as an evaporation area and the main heat exchanger 8 which serves as a superheated area, attaining high dehumidifying power.

As described previously, the indoor unit 1 is constructed such that the inlet ports 2 and 3 are provided in the front and on the top, respectively, the first and second indoor heat exchangers 8a and 8b in the main indoor heat exchanger 8 are respectively opposed to the inlet ports 2 and 3 and arranged in the form of the reverse of the letter V to surround the indoor fan 9, and the auxiliary heat exchanger 7 is placed between the second indoor heat exchanger 8b and the inlet port 3 on the top. Thus, a good ventilation passage is secured for the auxiliary and main indoor heat exchangers 7 and 8 with the indoor unit 1 kept small in size, improving the efficiency of heat exchange between the refrigerant and the inlet air. This will also achieve the energy-saving effect.

When operated, the electric heater 17 heats the air that passed through the auxiliary indoor heat exchanger 7 and the indoor heat exchangers 8a and 8b, Thus, the temperature of the outlet air is regulated, preventing cold air from being discharged into the room at the time of dehumidifying operation.

The electric heater 17 is placed in the space between the heat exchangers 8a and 8b and the indoor fan 9, thus eliminating the need of providing special space only for placement of the electric heater 17. The space within the indoor unit 1 is utilized effectively.

The electric heater 17 is positioned immediately below the vertex of the arrangement of the heat exchangers 8a and 8b in the form of the reverse of the letter V, preventing drain water from falling on to the heater 17. Moreover, since the water avoiding member 18 is placed over the heater, it is safe.

When the remote control unit 50 is operated to stop the operation (YES in step 109), the compressor 21, the indoor fan 9 and the outdoor fan 25 are stopped, so that the dehumidifying operation is put to a stop (step 110).

In summary, since a short-circuit air passage is formed at the time of dehumidifying operation, the living space is kept from outlet air, enabling comfortable dehumidification with no feeling of cold.

Since refrigerant evaporation is completed only by the auxiliary indoor heat exchanger 7, dehumidification can be performed without a decrease in the room temperature. In addition, air cooled and dehumidified by the auxiliary indoor heat exchanger 7 is reheated by the main indoor heat exchanger 8, keeping the room temperature from falling.

To form the short-circuit air passage, the indoor fan 9 is driven at low speed, ensuring that it is formed.

Air passed through the auxiliary and main indoor heat exchangers 7 and 8 is heated by the heater 17 when necessary, preventing cold air from discharged into the room.

The electric heater 17 is placed in the space surrounded by the the first and second indoor heat exchangers 8a and 8b and the indoor fan 9, thus permitting an effective utilization of the space within the indoor unit 1.

The short-circuit air passage is formed after a lapse of the fixed time $t_1$ from the start of dehumidifying operation, thus permitting the utilization of the dehumidification as weak cooling.

When the short-circuit passage is formed, outlet air is concentrated centrally by the right-and-left louvers 10 to help form the passage, thus ensuring that the path is formed successfully.

Although, in the above-described embodiment, the short-circuit air passage is formed after a lapse of a fixed time $t_1$ from the start of dehumidifying operation, it may be formed when the room temperature (inlet air temperature) Ta sensed by the room temperature sensor 15 falls by a predetermined value after the start of dehumidifying operation. In either case, the indoor unit is forced to wait for a short-circuit air passage to be formed until a person in the living space begins to have a feeling of cold.

Although, in the above-described embodiment, the auxiliary indoor heat exchanger 7 is used as as evaporating area, and the main indoor heat exchanger 8 is used as a superheating area, this is not restrictive. Instead, an arrangement of FIG. 7 may be used.

Figure 7:
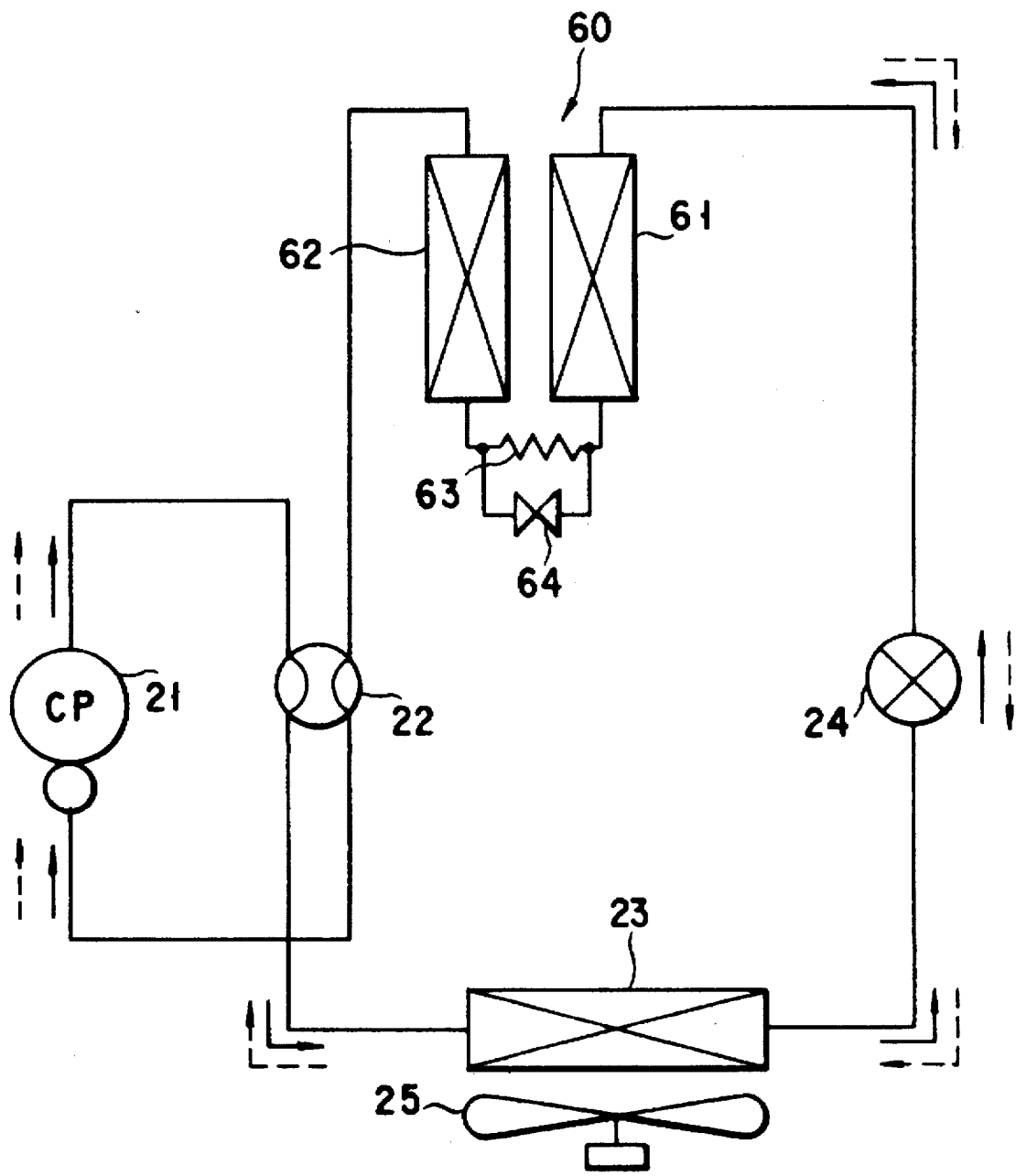
FIG. 7 is a piping diagram illustrating a modification of the refrigerating cycle in the first embodiment.

As shown in FIG. 7, an indoor heat exchanger 60 is constructed from first and second indoor heat exchangers 61 and 62, and a bypass circuit of a parallel combination of an expansion device 63 and a two-way valve 64 is connected between the heat exchangers 61 an 62.

At the time of dehumidifying operation, while the two-way valve 64 is closed, causing a refrigerant to flow in the direction of solid arrows. The second heat exchanger 62 functions as an evaporator, while the first heat exchanger 61 functions a reheater.

By forming a short-circuit air passage at the time of dehumidifying operation, dehumidification is performed with outlet air kept from reaching the living space, permitting comfortable dehumidification with no feeling of cold. The expansion device 63 and the two-way valve 64 may be replaced with a motor-operated expansion valve.

Next, a second embodiment of the invention will be described with reference to the relevant drawings.

In the relevant drawings, like reference numerals are used to denote corresponding parts to those in the first embodiment and detailed description thereof is omitted.

Figure 8:
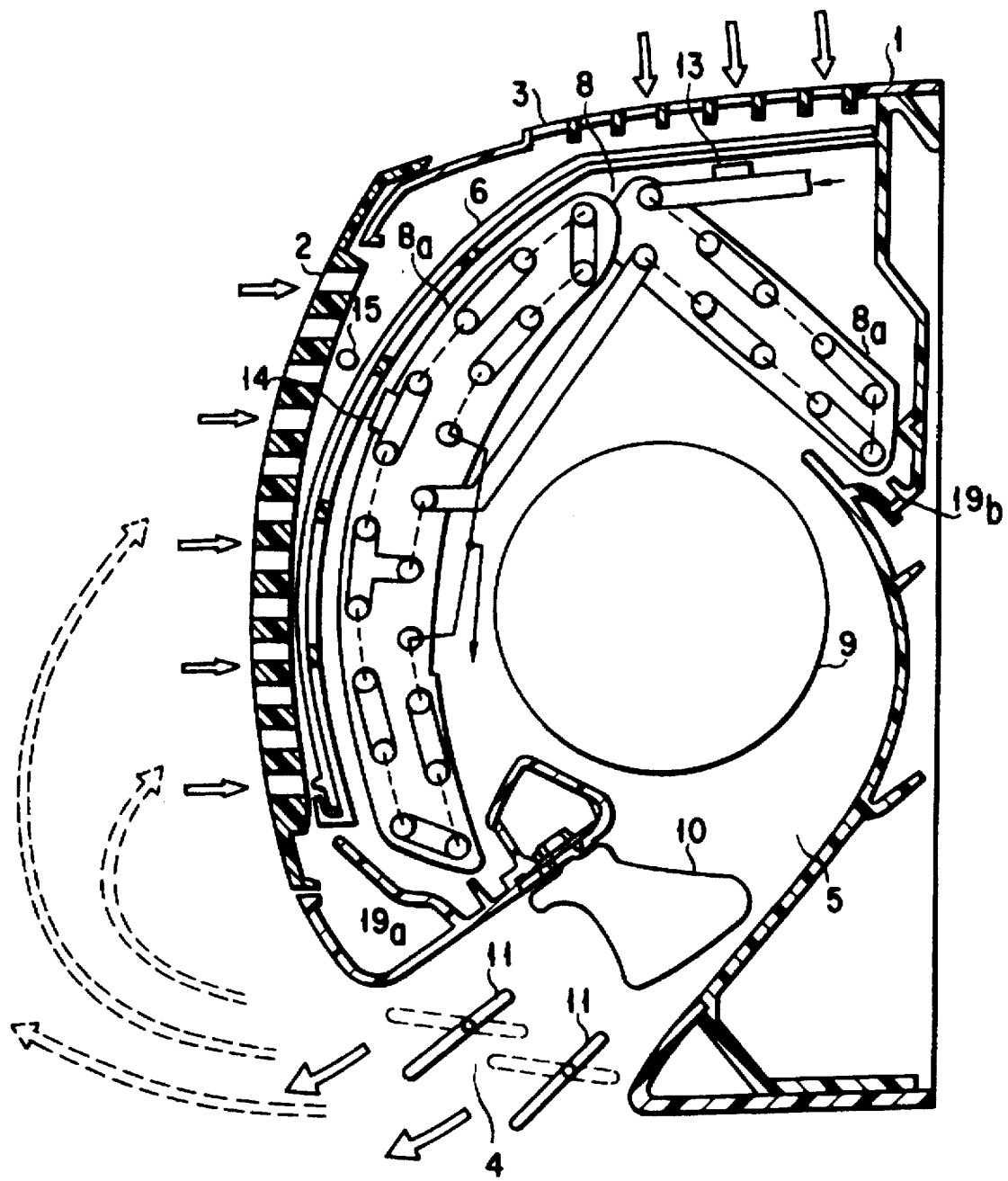
FIG. 8 is a cross-sectional view of an indoor unit according to second and third embodiments of the invention.

As shown in FIG. 8, the auxiliary indoor heat exchanger 7, the electric heater 17 and the water avoiding member 18 are removed from the indoor unit 1. The temperature sensor 13 is mounted on the pipe connected to the second indoor heat exchanger 8b.

Figure 9:
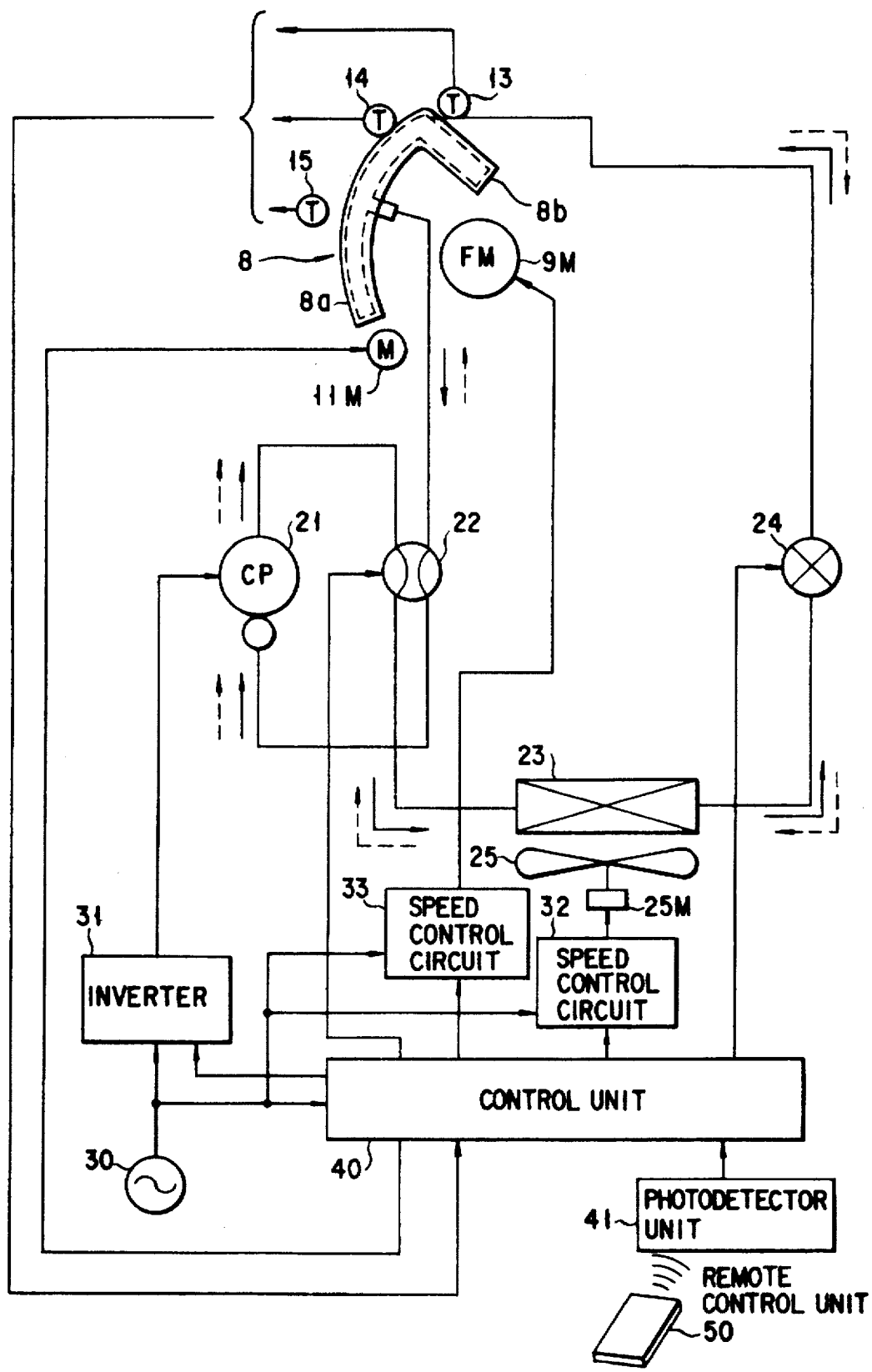
FIG. 9 shows a pipe arrangement of a refrigerating cycle and an arrangement of a control unit in the second and third embodiments.

As shown in FIG. 9, the louver driving motor 10M is removed. The right-and-left louvers 10 is operated manually.

The operation switching button 55 on the remote control unit 50 functions as a means for making a selection among a cooling operation, a heating operation, and a dehumidifying operation in the room temperature priority mode. The dehumidification dedicated button 56 on the remote control unit 50 functions as a means for selecting a dehumidifying operation in the dehumidification priority mode independently.

The room temperature priory mode refers to a dehumidifying operation that is performed with the room maintained at a set temperature. The dehumidification priority mode refers to a dehumidifying operation in which the dehumidification has priority over maintaining the room temperature. That is, in the dehumidification priority mode, some fall in the room temperature is allowed.

The control unit 40 has the following functional means [1] through [7].

[1] Cooling operation means for performing a cooling operation by forming a cooling cycle and causing the outdoor heat exchanger 23 and the indoor heat exchanger 8 to function as a condenser and an evaporator, respectively.

[2] Dehumidifying operation means for performing a dehumidifying operation by forming a dehumidifying cycle and controlling the motor-operated expansion valve 24 so that the temperature Tj of a part (second indoor heat exchanger 8b) of the indoor heat exchanger 8 reaches the dew-point temperature of the inlet air or less (evaporating area), the temperature Tc of the remainder (first indoor heat exchanger 8a) becomes higher than the dew-point temperature of the inlet air (superheating area), and the difference ΔTcj between Tc and Tj takes a predetermined value.

[3] Operating means for, at the time of dehumidifying operation, rotating the up-and-down louvers 11 upward from the horizontal blowoff position to form a short-circuit air passage through which air discharged from the outlet port 4 flows to the inlet port 2.

[4] Correcting means for storing the temperature Ta sensed by the room temperature sensor 15 when the short-circuit air passage is formed as $T_1$, storing the temperature Ta sensed by the sensor 15 after a lapse of a given time from the formation of the short-circuit air passage as $T_2$, correcting the subsequent sensed temperature Ta with $T_1$ and $T_2$, and using the corrected temperature as the room temperature Tao.

[5] Room temperature priority mode control means for, at the time of dehumidifying operation, controlling the operating frequency F of the compressor 21 (the output frequency of the inverter 31) so that the room temperature Tao sensed by the temperature sensor 15 or corrected by the correcting means is maintained at a predetermined set temperature Ts of the room.

[6] Dehumidification priority mode control means for, at the time of dehumidifying operation, lowering the operating frequency F of the compressor 21 in steps down to a predetermined value, for example, the lowest operating frequency Fmin.

[7] Operation control means for, at the time of dehumidifying operation in the dehumidification priority mode, interrupting the operation of the compressor 21 when the room temperature Tao falls by a value larger than a predetermined value.

Next, the operation of the above-described arrangement will be described.

When dehumidifying operation is started on the remote control 50, the compressor 21 is activated to form a dehumidifying cycle and the operation of the indoor fan 9 and the outdoor fan 25 is started.

The dehumidifying operation is selected by pressing the operation switching button 55 on the remote control unit 50, the dehumidifying operation enters the room temperature priority mode.

Figure 10:
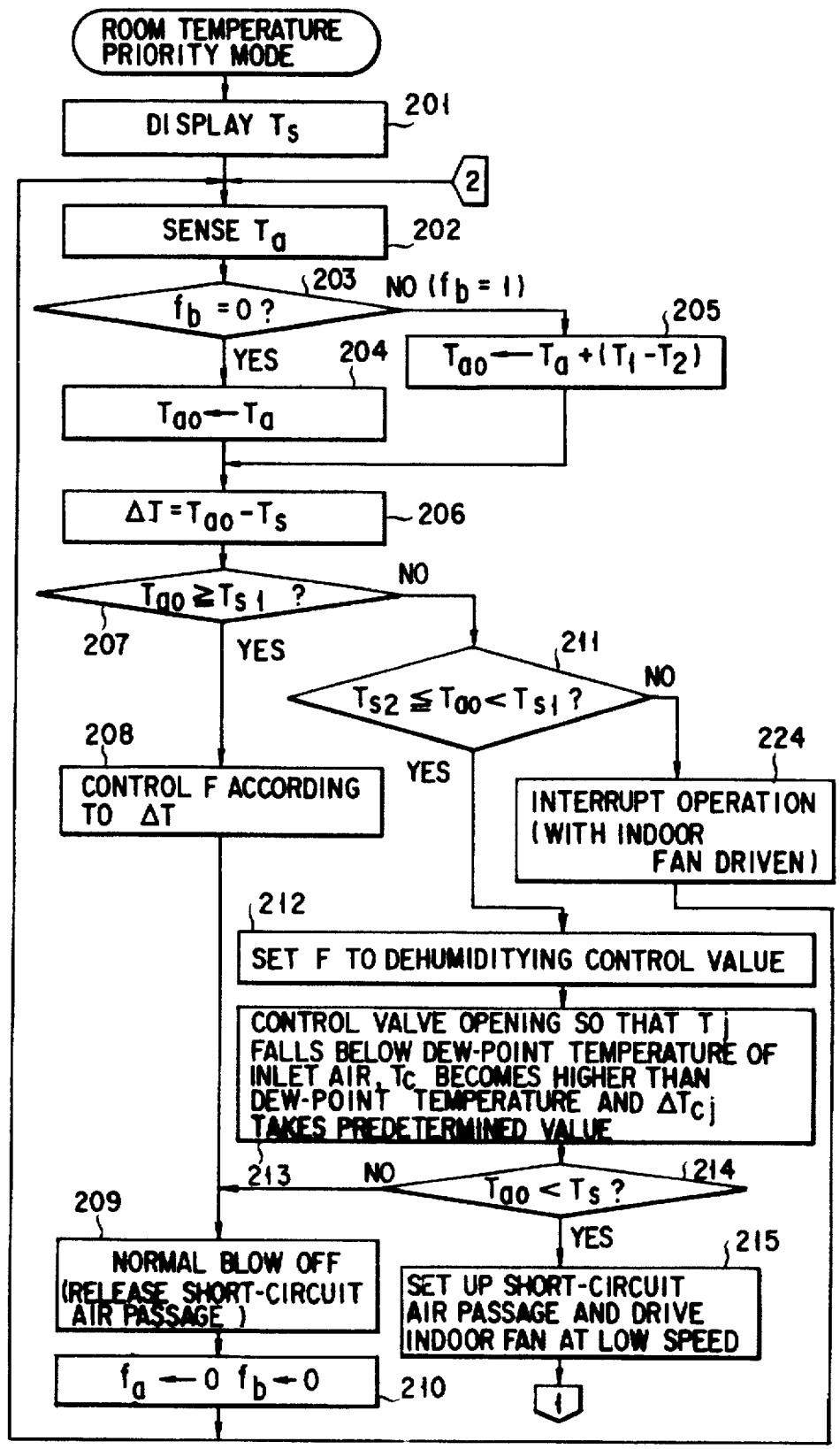

The control in the room temperature priority mode will be described with reference to FIGS. 10 and 11 illustrating a flowchart of the operation in the room temperature priority mode.

The room temperature Ts set in advance on the remote control unit 50 is, as shown in FIG. 3, displayed on the display 51 (step 201). This display helps the user know that the operation is in the room temperature priority mode.

The temperature Ta of air sucked into the indoor unit 1 is sensed by the room temperature sensor 15 (step 202). If the flag fb is 0 (YES in step 203), then the temperature Ta sensed by the sensor 15 is used as the room temperature Tao without correction (step 204).

The difference $\Delta T$ (=Ta−Ts) between the room temperature Tao and the set room temperature Ts is obtained (step 206).

If the room temperature Tao corresponds to one of zones e, f, g, h, i above a set value $Ts_1$ as shown in FIG. 12 (YES in step 207), then the operating frequency F of the compressor 21 is controlled according to the temperature difference $\Delta T$ (step 208). Thereby, the room temperature Tao is maintained at the set room temperature Ts. Since the operating frequency F in this case is set to a little high value for cooling, the room temperature Tao can be changed to the set room temperature Ts.

The set value $Ts_1$ is set to be higher than the set room temperature Ts by a predetermined value (say, 0.5° C.).

With the operating frequency set to a cooling control value, the opening of the motor-operated expansion valve 24 is controlled so that all the first and second indoor heat exchangers 8a and 8b serve as evaporating areas. This is control at the time of a general cooling operation.

At the outlet port 4 of the indoor unit 1, the louvers 11 are set to take up the normal blowoff position by the remote control unit 50 (step 209). flags fa and fb are both set to 0 (step 210).

After that, when the room temperature Tao comes to correspond to one of zones b, c and d in the range from $Ts_2$ to less than $Ts_1$ (NO in step 207, YES in step 211), the operating frequency F is set to a dehumidifying control value (step 212). The dehumidifying control value is set much lower than the cooling control value (for example, 16 Hz or under).

The set value $Ts_2$ is less than the set room temperature Ts by a predetermined value (for example, 4.0° C.).

With the operating frequency F set to the dehumidifying control value, the opening of the expansion valve 24 is controlled so that the temperature Tj of the second indoor heat exchanger 8b sensed by the temperature sensor 13 falls below the dew-point temperature of the inlet indoor air, the temperature Tc of the first indoor heat exchanger 8a sensed by the temperature sensor 14 rises above the dew-point temperature, and $\Delta Tcj$=Tc−Tj takes a given value $\Delta Tcj_1$ (step 213).

For example, if $\Delta Tcj > \Delta Tcj_1$, then the opening of the expansion valve 24 is decremented by a predetermined value with each lapse of a predetermined time in the control loop. If, on the other hand, $\Delta Tcj < \Delta Tcj_1$, then the opening of the expansion valve 24 is incremented by a predetermined value with each lapse of a predetermined time in the control loop. When $\Delta Tcj$ becomes equal to $\Delta Tcj_1$, the opening of the expansion valve 24 at that time is preserved unchanged.

By this control, the inlet indoor air is cooled and dehumidified only by the second indoor heat exchanger 8b, and then discharged into the room without heat exchange in the first indoor heat exchanger 8a. Waterdrops on the second heat exchanger 8b fall along its heat exchange pipe and radiation fins on to the drain collector 19b.

Here, the dehumidifying function of the second indoor heat exchanger 8b will be described.

The amount of circulating refrigerant increases with increasing operating frequency F. If $\Delta Tcj_1$, the target value of $\Delta Tcj$, were constant for any operating frequency F, the refrigerant evaporation would take place in the first indoor heat exchanger 8a as well as the second indoor heat exchanger 8b due to an increase in the amount of the circulating refrigerant. Then, not only the dehumidifying function but also the cooling function would be achieved.

If $\Delta Tcj$ can be changed according to the operating frequency F of the compressor 21, the refrigerant evaporation can be finished in only the second indoor heat exchanger 8b, even though the amount of the circulating refrigerant increases. For this reason, $\Delta Tcj_1$ is set to a value proportional to the operating frequency F. This allows only the second indoor heat exchanger 8b to have the dehumidifying function irrespective of changes in the compressor power, checking any fall in the room temperature.

In this manner, a fall in the room temperature can be checked without an electric heater for reheating, preventing the power consumption from increasing. There is no need for an expansion valve for separating an indoor heat exchange system into an evaporator and a reheater, thus eliminating a problem that a sound resulting from rapid expansion of the refrigerant leaks to the room.

If an expansion valve were provided for separating an indoor heat exchange system into an evaporator and a reheater, an unbalanced cycle would result in which the capacity of a condenser (=outdoor heat exchanger+reheater) increases and the capacity of the evaporator decreases. Under such conditions, the refrigerant liquefied in the condenser would be sucked into the compressor without being fully evaporated in the evaporator, or the refrigerant would be gathered in the condenser to thereby overheat the compressor.

As described previously, the indoor unit 1 is constructed such that the inlet ports 2 and 3 are provided in the front and on the top, respectively, and the indoor heat exchangers 8a and 8b are respectively opposed to the inlet ports 2 and 3 and arranged in the form of the reverse of the letter V to surround the indoor fan 9. Thus, a good ventilation passage is secured for the indoor heat exchangers 8a and 8b with the indoor unit 1 kept small in size, improving the efficiency of heat exchange between the refrigerant and inlet indoor air. This will also achieve the energy-saving effect.

Since the operating frequency F is set to a control value for dehumidification which is much lower than that for cooling, the compressor 21 is operated at a little low power. Thus, the room temperature can be converged smoothly to the set room temperature Ts. The power consumption is reduced and the energy-saving effect is achieved.

In this case, the controlled value of the operating frequency F can be set to the one for dehumidification which is much lower than that for cooling taking into consideration the fact that the evaporation of the refrigerant is completed only in the second indoor heat exchanger 8b and that the dehumidifying operation itself is frequently selected in seasons when the room temperature is not too high.

When the room temperature Tao goes lower than the set room temperature Ts (step 214), the up-and-down louvers 11 are rotated upward as shown by broken lines in FIG. 8, so that a short-circuit air passage is formed through which air discharged from the outlet port 4 flows into the inlet port 2 (step 215).

By the short-circuit air passage being formed, the dehumidifying operation can be continued without the outlet air reaching the living space in the room. Thus, comfortable dehumidification with no feeling of cold is made possible. After the short-circuit air passage has been formed, part of air will be sucked continuously into the inlet port 2. However, since the diffusion speed of moisture in the air is sufficiently high, the air in the living space is sufficiently dehumidified by moisture diffusion.

At the same time the short circuit air passage is formed, the indoor fan 9 is operated at low speed (step 215). By this low-speed operation, air discharged from the outlet port 4 flows to the inlet port 2 without flowing far away, ensuring the formation of the short-circuit air passage.

Moisture in the air moves by diffusion, not by air flow. As can be seen from this fact, the stopping of the indoor fan 9 during dehumidifying operation will not impair the dehumidifying power. If the indoor fan 9 were stopped, cold air would flow from the space between the outlet port 4 and the louvers 11. The reason why the fan 9 is driven at low speed includes preventing cold air from being discharged into the room.

When the short-circuit air passage is formed, the temperature Ta sensed by the room temperature sensor 15 is stored as $T_1$ (step 217). The flag fa is set to 1 (step 218), and the time count t is started (step 219).

The flag fa is an indication of whether $T_1$ has been stored or not. When the flag fa is 1 (NO in step 216), steps 217, 218 and 219 will not be performed.

When the time count reaches the given time t1 (YES in step 220), the sensed temperature Ta by the room temperature sensor 15 is stored as $T_2$ (step 222) and the flag is set to 1 (step 223).

The flag fb is an indication of whether Ts has been stored or not. With fb=1 (NO in step 221), steps 222 and 223 will not be performed.

If fb=1 (NO in step 203), then $T_1-T_2$ is sought and then added to the sensed temperature Ta by the room temperature sensor 15 to obtain Ta+($T_1-T_2$) (step 205). After that, Ta+($T_1-T_2$) is used as the room temperature Tao for subsequent control.

The sensed temperature Ta by the temperature sensor 15 indicates the same value as the temperature of the air passed through the first indoor heat exchanger 8a immediately after the short-circuit air passage has been formed. After a lapse of the given time t1 from the formation of the short-circuit air passage, the temperature of the air around the indoor unit 1 is stabilized and the difference between the sensed temperature by the room temperature sensor 15 and the actual room temperature becomes approximately constant.

The difference, T1–T2, indicates a value corresponding to a fall in temperature due to the formation of the short-circuit air passage, which corresponds to the difference between the sensed temperature Ta and the actual room temperature. Thus, the addition of T1–T2 to the sensed temperature Ta permits the actual room temperature to be grasped exactly. Thereby, the room temperature control reliability is improved irrespective of the formation of the short-circuit air passage.

When the room temperature Tao falls below the set value $Ts_2$ (NO in step 211), the operating frequency F is set to zero and the operation of the compressor 21 is interrupted (step 224). Note that the operation of the indoor fan 9 is continued.

When the room temperature Tao then rises to the set value $Ts_2$ or more, the compressor 21 is restarted.

On the other hand, when the dehumidification dedicated button 56 is pressed on the remote control unit 50, a dehumidifying operation is performed in the dehumidification priority mode.

Figure 13:
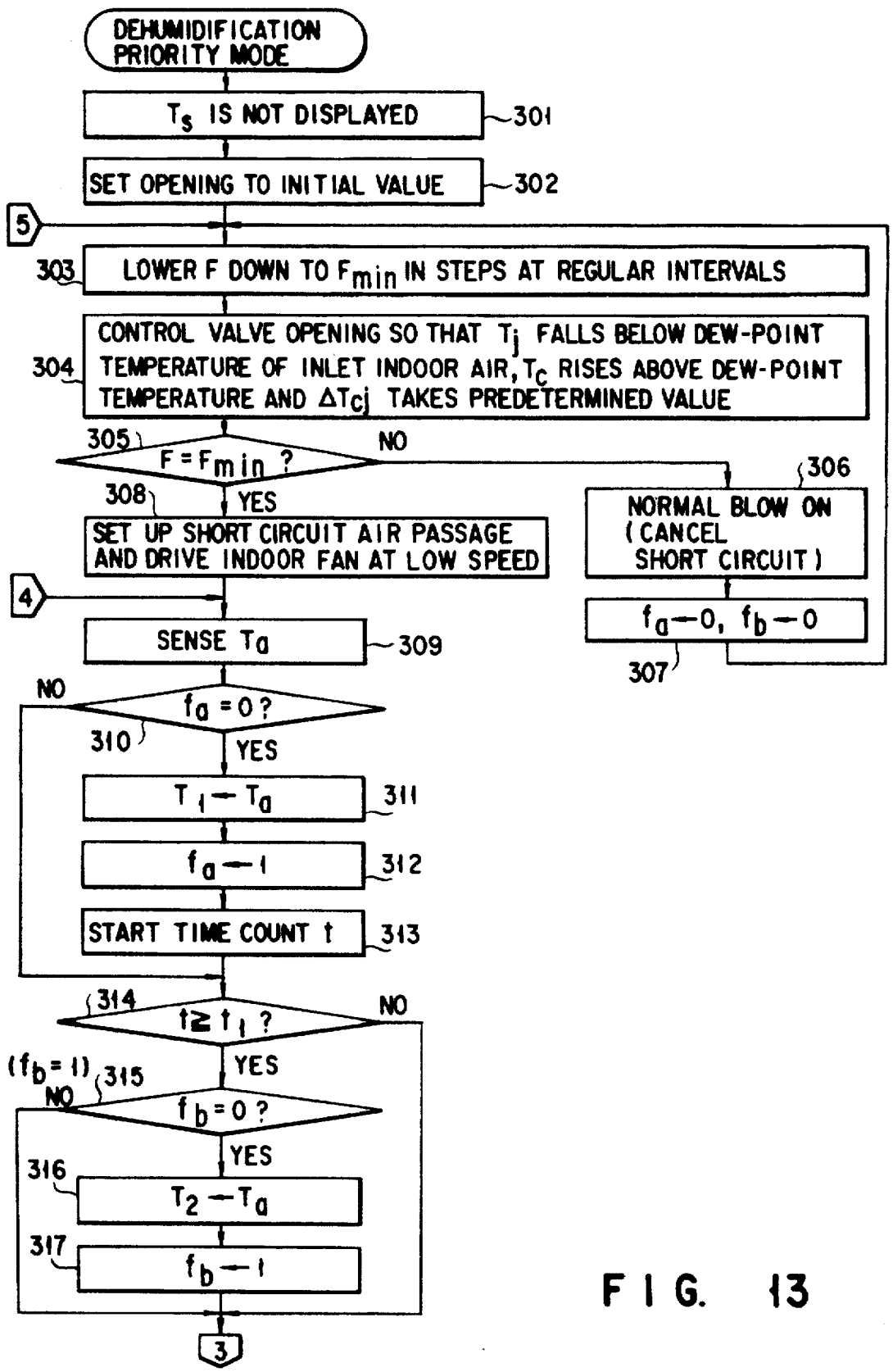
FIGS. 13 and 14 are a flowchart of the operation in dehumidification priority mode in the second embodiment.
Figure 14:
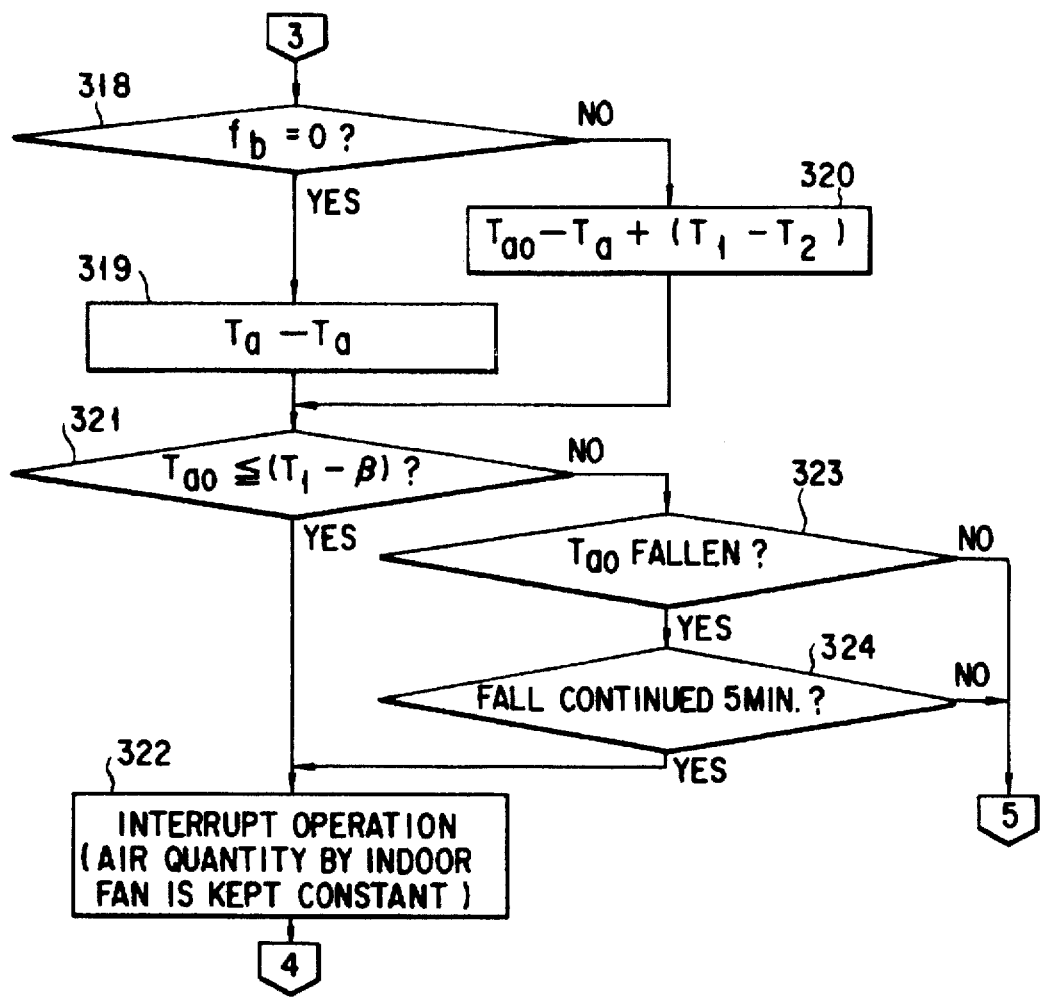

The control in the dehumidification priority mode will be described hereinafter with reference to a flowchart of FIGS. 13 and 14.

To inform the user of the dehumidification priority mode, the set room temperature Ts is not displayed on the display 51 of the remote control unit 50 (step 301).

At the start of the operation, the opening of the motor-operated expansion valve 24 is set to the initial value that is most suitable for dehumidification startup (step 302).

Figure 15:
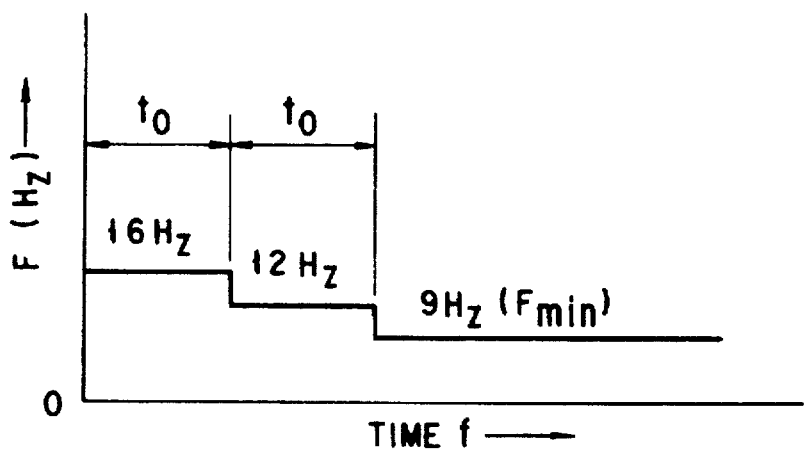
FIG. 15 shows changes in the operating frequency in the dehumidification priority mode in the second and third embodiments.

The operating frequency F of the compressor 21 is first set to the value (=16 Hz) that is most suitable for dehumidification startup and then lowered down to the lowest operating frequency Fmin in steps at regular intervals of to (step 303). The manner in which the operating frequency F is changed is illustrated in FIG. 15.

As with the room temperature priority mode, in the dehumidification priority mode, the controlled value of the operating frequency F is selected to be a value for dehumidification that is much smaller than that for cooling, thus reducing the power consumption and achieving the energy-saving effect. With the control of the operating frequency F, the opening of the motor-operated expansion valve 24 is controlled so that the temperature Tj of the second indoor heat exchanger 8b sensed by the temperature sensor 13 falls below the dew-point temperature of the inlet indoor air, the temperature Tc of the first indoor heat exchanger 8a sensed by the temperature sensor 14 rises above that dew-point temperature, and ΔTcj=Tc−Tj takes a predetermined value $\Delta Tcj_1$ (step 304). $\Delta Tcj_1$ is a value proportional to the operating frequency F of the compressor 21.

By this opening control, the inlet indoor air is cooled and dehumidified only in the second indoor heat exchanger 8b and then discharged into the room without heat exchange in the first indoor heat exchanger 8a. The water on the second indoor heat exchanger 8b falls along its heat exchange pipe and radiation fins on to the drain collector 19b.

At the inlet port 4 of the indoor unit 1, the louvers 11 are set to take the normal blowoff position as instructed by the remote control unit 50 (step 306). The flags fa and fb are both set to 0 (step 307).

When the operating frequency F falls to the lowest operating frequency Fmin (YES in step 305), the short-circuit air passage is formed (step 308), preventing the outlet air from reaching the living space in the room. The dehumidification can be continued with the outlet air kept from reaching the living space, providing comfortable dehumidification without a feeling of cold. In this case, the indoor fan 9 is driven at low speed, causing the air discharged from the outlet port 4 to flow to the inlet port 2 without flowing far away, thereby ensuring that the short-circuit air passage is formed.

There is a time interval between the time the dehumidifying operation is started and the time the short-circuit air passage is formed. The time interval substantially corresponds to the time which elapses before a person in the living space comes to have a feeling of cold. Before a person in the living space has a feeling of cold, the normal air blowoff is performed to smooth the startup of the refrigeration cycle, thereby hastening the achievement of the dehumidifying effect.

The room temperature Ta is sensed by the temperature sensor 15 (step 309). If the flag fa is 0 (YES in step 310), then the sensed temperature Ta is stored as $T_1$ (step 311). The flag fa is set to 1 (step 312) and the time count t is started (step 313).

When the fag fa is 1 (NO in step 310), steps 311, 312 and 313 are not performed.

Before the given time $t_1$ is reached (NO in step 314), the sensed temperature Ta by the sensor 15 is used unchanged as the room temperature Tao (step 319).

When the given time $t_1$ is reached (YES in step 314), the sensed temperature Ta by the sensor 15 is stored as $T_2$ (step 316). Then, the flag fb is set to 1 (step 317).

When the flag fb is 1 (NO in step 315), steps 316 and 317 are not performed.

When the flag fb is 1 (NO in step 318), the difference, $T_1-T_2$, is sought and then added to the sensed temperature Ta by the sensor 15 (step 320). In subsequent control, the sum, $Ta+(T_1-T_2)$, is used as the room temperature Tao. This allows the room temperature to be gasped exactly irrespective of the formation of the short-circuit air passage.

A value, which is $\beta$ lower than $T_1$, i.e., $T_1-\beta$, and defined as a set value, is compared with Tao (step 321).

When Tao falls below the setting ($=T_1-\beta$) (YES in step 321), the operating frequency F is set to zero to interrupt the operation of the compressor 21 (step 322), thereby preventing the room temperature from falling. The operation of the indoor fan 9 is continued.

If, even when Tao is higher than the set value (NO in step 321), the room temperature Ta falls and it lasts for a predetermined period (for example, five minutes) (YES in step 323, YES in step 324), then the operation of the compressor 21 is interrupted (step 322). This prevents the room temperature from falling.

When the room temperature stops falling, the procedure returns to step 303 in which the compressor 21 is restarted.

According to the second embodiment, the remote control unit 50 is provided with the operation switching button 55 for selecting between the room temperature priority mode and the dehumidification priority mode and the dehumidification dedicated button 56 for selecting the dehumidification priority mode independently, thus allowing the user to optionally select between two types of dehumidifying operation in the room temperature priority mode and the dehumidification priority mode with a simple operation.

Which of the room temperature priority mode and the dehumidification priority mode is selected is indicated through the presence or absence of display of the set room temperature Ts on the remote control unit 50, allowing the user to know easily which of the modes is selected.

Next, a third embodiment of the invention will be described.

The control unit 40 has the following functional means [1] through [6].

[1] Cooling operation means for performing a cooling operation by forming a cooling cycle and causing the outdoor heat exchanger 23 and the indoor heat exchanger 8 to function as a condenser and an evaporator, respectively.

[2] Dehumidifying operation means for performing a dehumidifying operation by forming a dehumidifying cycle and controlling the motor-operated expansion valve 24 so that the temperature Tj of a part (second indoor heat exchanger 8b) of the indoor heat exchanger 8 falls below the dew-point temperature of inlet air (evaporating area), the temperature Tc of the remainder (first indoor heat exchanger 8a) rises above the dew-point temperature of the inlet air (superheating area), and the difference $\Delta Tcj$ between Tc and Tj takes a predetermined value.

[3] Operating means for, at the time of dehumidifying operation, rotating the up-and-down louvers 11 upward from the horizontal blowoff position to form a short-circuit air passage through which air discharged from the outlet port 4 flows to the inlet port 2.

[4] Room temperature priority mode control means for, at the time of dehumidifying operation, controlling the operating frequency F of the compressor 21 (the output frequency of the inverter 31) so that the room temperature Ta sensed by the temperature sensor 15 is maintained at a preset temperature Ts of the room.

[5] Dehumidification priority mode control means for, at the time of dehumidifying operation, lowering the operating frequency F of the compressor 21 in steps down to a predetermined value, for example, the lowest operating frequency Fmin.

[6] Operation control means which, at the time of dehumidifying operation in the dehumidification priority mode, defines the sensed temperature Ta by the sensor 15 after a lapse of a fixed time (for example, 20 minutes) from the formation of the short-circuit air passage as a reference temperature Tam with a certain lower limit value (for example, 25° C.), interrupts the operation of the compressor when the range of falls of the sensed temperature Ta relative to the reference temperature Tam corresponds to a first set value (for example, 3° C.) or more, and restarts the compressor 21 when the range of falls is restored to a second set value (for example, 1° C.) or less and the sensed temperature Ta corresponds to a set value (for example, 15° C.) or more.

The third embodiment is the same as the second embodiment in other respects.

The operation will be described below.

Figure 16:
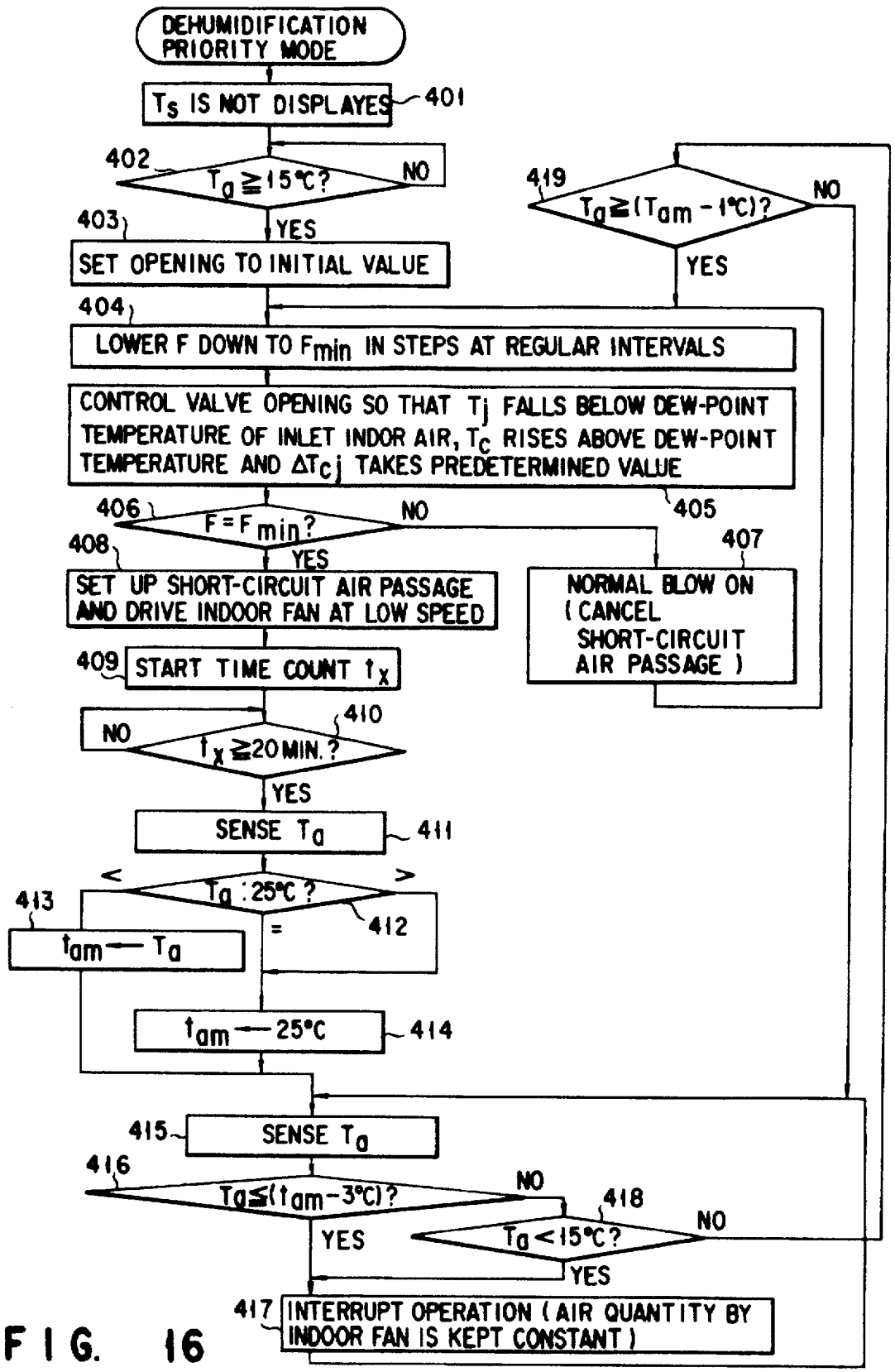
FIG. 16 is a flowchart of the operation of the dehumidification priority mode in the third embodiment.

The dehumidifying operation in the room temperature priority mode is the same as that in the second embodiment and description thereof is therefore omitted. The control in the dehumidification priority mode will be described below with reference to a flowchart of FIG. 16.

To indicate the dehumidification priority mode, no set room temperature Ts is displayed on the display 51 of the remote control unit 50 (step 401).

If the sensed temperature Ta by the room temperature sensor 15 is the set value (15° C.) or more (YES in step 402), then operation is started. At the start of the operation, the opening of the motor-operated expansion valve 24 is first set to the initial opening that is most suitable for dehumidification startup (step 403).

The operating frequency F of the compressor 21 is first set to a predetermined value (=16 Hz) most suitable for dehumidification startup and then lowered to the lowest operating frequency (9 Hz) in steps at regular intervals of $t_0$ (step 404). In this case, the operating frequency F is changed as shown in FIG. 15.

As with the room temperature priority mode, in the dehumidification priority mode, the controlled value of the operating frequency F is selected to be much lower than with the cooling operation, thereby reducing the power consumption and achieving the energy-saving effect.

With the control of the operating frequency F, the opening of the motor-operated expansion valve 24 is controlled so that the temperature Tj of the second indoor heat exchanger 8b sensed by the temperature sensor 13 falls below the dew-point temperature of the inlet indoor air, the temperature Tc of the first indoor heat exchanger 8a sensed by the temperature sensor 14 rises above the dew-point temperature, and the difference ΔTcj between Tc and Tj reaches a predetermined value $\Delta Tcj_1$ (step 405). The value $\Delta Tcj_1$ is proportional to the operating frequency F.

By this opening control, the inlet indoor air is cooled and dehumidified only in the second indoor heat exchanger 8b and then discharged into the room without heat exchange in the first indoor heat exchanger 8a. The water on the second indoor heat exchanger 8b falls along its heat exchange pipe and radiation fins on to the drain collector 19b.

At the inlet port 4 of the indoor unit 1, the louvers 11 are set to take the normal blowoff position as instructed by the remote control unit 50 (step 407).

When the operating frequency F falls to the lowest operating frequency Fmin (YES in step 406), the short-circuit air passage is formed (step 408), preventing the outlet air from reaching the living space in the room. The dehumidification can be continued with the outlet air kept from reaching the living space, providing comfortable dehumidification without a feeling of cold. In this case, the indoor fan 9 is driven at low speed, causing the air discharged from the outlet port 4 to flow to the inlet port 2 without flowing far away, thereby ensuring that the short-circuit air passage is formed.

There is a time interval between the time the dehumidifying operation is started and the time the short-circuit air passage is formed. The time interval substantially corresponds to the time which elapses before a person in the living space comes to have a feeling of cold. Before a person in the living space has a feeling of cold, the normal air blowoff is performed to smooth the startup of the refrigeration cycle, thereby allowing the the dehumidifying effect to be achieved quickly.

The time count $t_x$ is started at the same time the short-circuit air passage is formed (step 409). When 20 minutes are reached in the time count operation, the temperature Ta sensed by the room temperature sensor 15 at that time is specified as a reference temperature Tam with a certain lower limit value (25° C.) set (steps 411, 412, 423 and 414).

That is, one of the sensed temperature and the lower limit value which is lower than the other is specified as the reference temperature Tam. For example, when the sensed temperature Ta by the sensor 15 is 30° C..higher than the lower limit value, Ta will be specified as the reference temperature Tam. On the other hand, when Ta is 20° C..lower than the lower limit value, the lower limit value, i.e., 25° C., will be specified as the reference temperature Tam.

When the sensed temperature Ta by the room temperature sensor 15 falls below the reference temperature Tam and the difference therebetween exceeds 3° C., i.e., Ta<Tam−3° C., (step 415, YES in step 416), the operation of the compressor 21 is interrupted (step 417). Thereby, the room temperature becomes prevented from falling. The operation of the indoor fan 9 is continued.

Even when the sensed temperature Ta by the room temperature sensor 15 falls below the set value (15° C.) (YES in step 418), the operation of the compressor 21 is interrupted (step 417).

If the sensed temperature Ta rises afterwards to the set value (15° C.) or more (NO in step 418) and the difference between the reference temperature Tam and the sensed temperature Ta decreases to 1° C. or less (NO in step 419), then the procedure returns to step 404 in which the compressor 21 is restarted.

Figure 19:
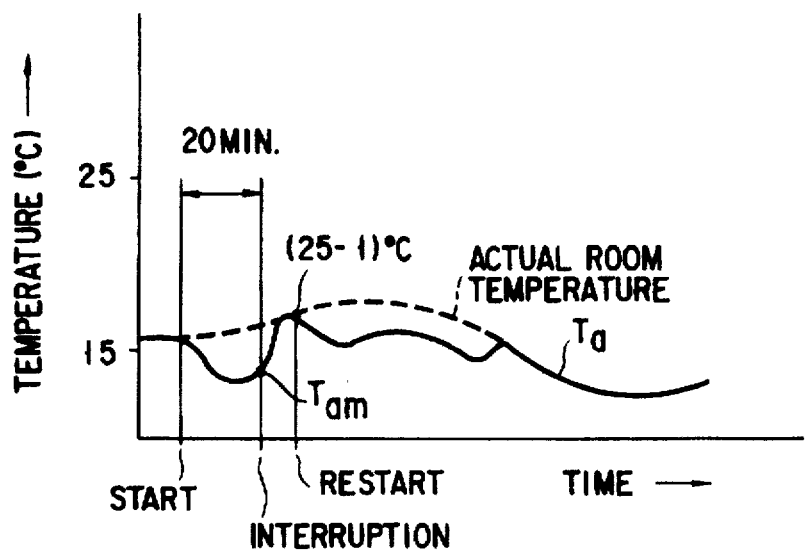
FIG. 19 shows changes in sensed temperature when the room temperature is close to a lower limit in the third embodiment.

Changes in the sensed temperature Ta by the room temperature sensor 15 when the room temperature (actual room temperature) is a little high are shown in FIG. 17. Changes in the sensed temperature Ta when the actual room temperature is a little high are illustrated in FIG. 18. Changes in the sensed temperature Ta when the actual room temperature is close to the set value (15° C.) are shown in FIG. 19.

Thus, by specifying the sensed temperature Ta after a lapse of 20 minutes from the formation of the short-circuit air passage as the reference temperature Tam and deciding the interruption of the operation of the compressor 21 according to a decrease in the sensed temperature Ta from the reference temperature Tam, the room temperature can be grasped exactly irrespective of the formation of the short-circuit air passage and the room temperature can be prevented from falling.

Since a lower limit (25° C.) is imposed on the setting of the reference temperature Tam, the third embodiment is free from such an inconvenience as the room temperature drops considerably prior to the interruption of the operation of the compressor 21.

Since the third embodiment makes it operation start and restart conditions that the sensed temperature Ta by the room temperature sensor 15 is the set value (15° C.) or more, the room temperature can be prevented from falling and a feeling of cold can be eliminated.

Figure 20:
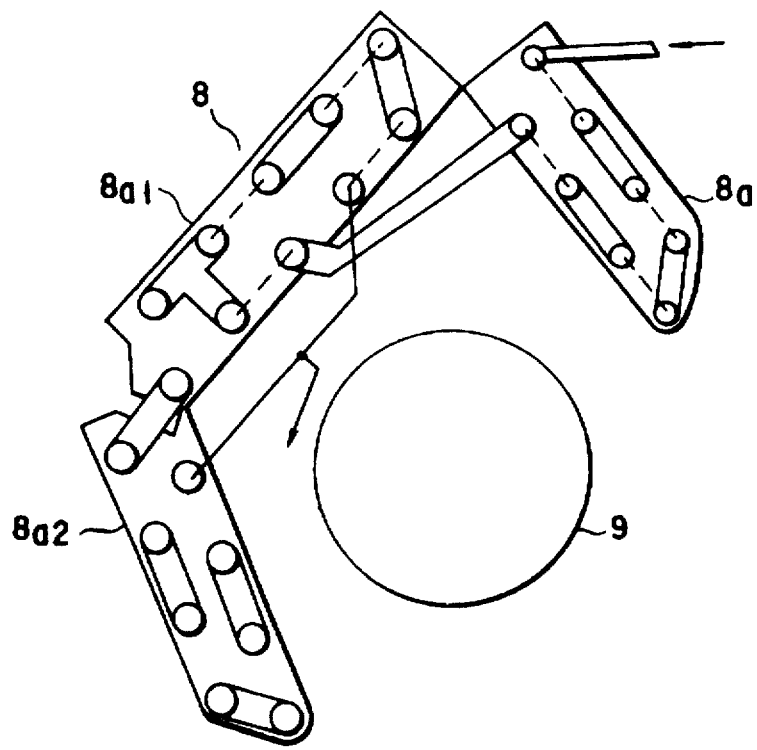
FIG. 20 shows a modification of the indoor heat exchanger in the first, second and third embodiments of the invention.

The second and third embodiments may be modified, as shown in FIG. 20, such that the first indoor heat exchanger 8a is divided into an upper heat exchanger $8a_1$ and a lower heat exchanger $8a_2$ and the exchangers $8a_1$ and $8a_2$ are arranged in the form of a curvature. In this case, the second indoor heat exchanger 8b serves as an evaporating area and the upper and lower heat exchangers serve as a superheating area for dehumidifying operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air-conditioning apparatus having a dehumidifying operation function comprising:

a refrigerating cycle constructed from a compressor, an outdoor heat exchanger, an expansion device, and an indoor heat exchanger which are coupled in series;

an indoor fan for circulating indoor air through said indoor heat exchanger;

an indoor unit accommodating said indoor fan and said indoor heat exchanger and having an inlet port for drawing in indoor air and an outlet port for discharging air passed through said indoor heat exchanger;

air-flow direction control means installed at said outlet port;

dehumidifying operation means for performing a dehumidifying operation by carrying a refrigerant discharged from said compressor through said outdoor heat exchanger, said expansion device, and said indoor heat exchanger to said compressor; and operation means for, at the time of said dehumidifying operation, operating said air-flow direction control means to form an air passage through which air discharged from said outlet port flows to said inlet port.

2. An apparatus according to claim 1, wherein said dehumidifying operation means controls said expansion device so that the evaporation of said refrigerant will be completed in part of said indoor heat exchanger at the time of dehumidifying operation.

3. An apparatus according to claim 1, wherein said indoor heat exchanger comprises a main indoor heat exchanger and an auxiliary indoor heat exchanger which are thermally isolated from each other, and said dehumidifying operation means controls said expansion device at the time of the dehumidifying operation so that said auxiliary indoor heat exchanger will function as an evaporator and said main indoor heat exchanger will not function as the evaporator.

4. An apparatus according to any one of claims 1, 2 and 3, further comprising speed control means for, at the time of dehumidifying operation, driving said indoor fan at a low speed.

5. An apparatus according to claim 3, wherein said inlet port comprises a first inlet port formed in the front of said indoor unit and a second inlet port formed on the top of said indoor unit, said main indoor heat exchanger comprises first and second indoor heat exchangers arranged in the form of the reverse of the letter V to surround said indoor fan, said first and second indoor heat exchangers being placed to face said first inlet port and said second inlet port, respectively, and said auxiliary indoor heat exchanger is placed between said second indoor heat exchanger and said second inlet port.

6. An apparatus according to claim 5, further comprising an electric heater for heating air passed through said indoor heat exchangers, said heater being placed in space surrounded by said first indoor heat exchanger, said second indoor heat exchanger, and said indoor fan.

7. An apparatus according to claim 1, wherein said operation means operates said air-flow direction control means after a lapse of a predetermined time from the start of said dehumidifying operation.

8. An apparatus according to claim 1, further comprising temperature sensor means for sensing the temperature of the indoor air.

9. An apparatus according to claim 8, wherein said operation means operates said air-flow direction control means from the time a sensed temperature by said temperature sensor means falls by a predetermined value after the start of said dehumidifying operation.

10. An apparatus according to claim 1, wherein said air-flow direction control means comprises an up-and-down air flow direction control louver, and said operation means rotates said up-and-down air-flow direction control louver upward with respect to its horizontal position to thereby form said air passage through which air discharged from said outlet port flows to said inlet port.

11. An apparatus according to claim 1, wherein said air-flow direction control means comprises an up-and-down air flow direction control louver and a plurality of right-and-left air-flow direction control louvers, and said operation means rotates said up-and-down air-flow direction control louver upward with respect to its horizontal position to thereby form said air passage through which air discharged from said outlet port flows to said inlet port and operates said plurality of right-and-left air-flow direction control louvers so that the flow of air to be discharged from said outlet port will be concentrated centrally in the right-and-left direction.

* * * * *